(12) United States Patent
Pourali et al.

(10) Patent No.: US 10,198,308 B2
(45) Date of Patent: Feb. 5, 2019

(54) AVAILABILITY-ESTIMATE BASED CONFIGURATION GENERATION

(71) Applicants: Parsa Pourali, Waterloo (CA); Maria Toeroe, Montreal (CA)

(72) Inventors: Parsa Pourali, Waterloo (CA); Maria Toeroe, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 97 days.

(21) Appl. No.: 15/122,099

(22) PCT Filed: Mar. 12, 2015

(86) PCT No.: PCT/IB2015/051823
§ 371 (c)(1),
(2) Date: Aug. 26, 2016

(87) PCT Pub. No.: WO2015/140678
PCT Pub. Date: Sep. 24, 2015

(65) Prior Publication Data
US 2017/0068588 A1  Mar. 9, 2017

Related U.S. Application Data

(60) Provisional application No. 62/018,788, filed on Jun. 30, 2014, provisional application No. 61/955,535, filed on Mar. 19, 2014.

(51) Int. Cl.
*G06F 11/07* (2006.01)
*H04L 12/24* (2006.01)
*G06F 11/00* (2006.01)

(52) U.S. Cl.
CPC ........ *G06F 11/0793* (2013.01); *G06F 11/008* (2013.01); *G06F 11/0706* (2013.01);
(Continued)

(58) Field of Classification Search
CPC .............. G06F 11/0751; G06F 11/079; G06F 11/0793; G06F 11/30; G06F 11/008;
(Continued)

(56) References Cited

U.S. PATENT DOCUMENTS

| 6,411,910 B1 * | 6/2002 | Eulau | G06Q 10/06 700/291 |
| 6,854,069 B2 * | 2/2005 | Kampe | H04L 41/0659 714/4.12 |

(Continued)

OTHER PUBLICATIONS

Pourali et al., Enhanced Configuration Generation Approach for Highly Available COTS Based Systems, 2014 9th International Conference on Availability, Reliability and Security, pp. 104-113.
(Continued)

*Primary Examiner* — Nadeem Iqbal
(74) *Attorney, Agent, or Firm* — Julie Dufort; Ericsson Canada Inc.

(57) ABSTRACT

A system is adapted to generate a configuration for a service provider system to provide a highly available (HA) service. The system first identifies type stacks that provide the HA service and one or more component types in each type stack. Each type stack is a combination of prototypes that describe features and capabilities of available software providing the HA service. The system estimates, for each component type in the type stacks, a mean-time-to-recover (MTTR) of the HA service based on time for completing an actual recovery action in response to a component failure. The system further estimates service availability provided by each type stack based on the MTTR and a mean-time-to-failure (MTTF) of each component type in the type stack. The system then eliminates one or more of the type stacks that do not satisfy a requested service availability before proceeding to subsequent steps of configuration generation.

22 Claims, 13 Drawing Sheets

(52) U.S. Cl.
CPC ........ *G06F 11/079* (2013.01); *G06F 11/0751* (2013.01); *H04L 41/0836* (2013.01)

(58) Field of Classification Search
CPC .... G06F 11/0706; H04L 43/08; H04L 43/103; H04L 43/16
See application file for complete search history.

(56) References Cited

U.S. PATENT DOCUMENTS

| | | | |
|---|---|---|---|
| 7,830,813 B1 | 11/2010 | Lo et al. | |
| 8,555,238 B2 | 10/2013 | White et al. | |
| 8,695,012 B2* | 4/2014 | Kanso | G06F 9/5083 714/4.1 |
| 2006/0129367 A1 | 6/2006 | Mishra et al. | |
| 2007/0083650 A1* | 4/2007 | Collomb | G06Q 10/04 709/224 |
| 2008/0244552 A1* | 10/2008 | Toeroe | G06F 8/60 717/168 |
| 2009/0172168 A1* | 7/2009 | Sonoda | G06F 9/5061 709/226 |
| 2012/0221900 A1 | 8/2012 | Yagi | |
| 2012/0240129 A1* | 9/2012 | Kanso | G06F 9/505 718/105 |
| 2013/0297755 A1* | 11/2013 | Ritvanen | H04L 41/0233 709/220 |
| 2016/0335161 A1 | 11/2016 | Toeroe et al. | |

OTHER PUBLICATIONS

Salehi et al., A Model Driven Approach for AMF Configuration Generation, F.A. Kraemer and P Herrmann (Eds.): SAM 2010, LNCS 6598, Springer-Verlag Berlin Heidelberg, 2011, pp. 124-143.
Wang et al., Modeling User-Perceived Service Availability, M. Malek, E. Nette and N. Surf (Eds.): ISAS 2005, LNCS 3694, Springer-Verlag Berlin Heidelberg, 2005, pp. 107-122.
Marsan et al., On Petri Nets With Deterministic and Exponentially Distributed Firing Times, Adv. Petri Nets 1987, pp. 132-145.
Kimura et al., Statistical Software Reliability Prediction and Its Applicability Based on Mean Time between Failures, Pergamon, Mthl. Comput. Modelling vol. 22, No. 10-12, 1995, pp. 149-155.
German et al., TimeNET—A Toolkit for Evaluating Non-Markovian Stochastic Petri Nets, IEEE 1995, pp. 210-211.
Kanso, Automatic Generation of AMF Compliant Configurations, Thesis, Concordia University, Aug. 2008, pp. 1-125.
Billinton et al., Reliability Evaluation of Engineering Systems, Plenum Press New York and London, 1992, pp. 1-11.
Salehi, A Model Based Framework for Service Availability Management, Thesis, Concordia University, Apr. 2012, pp. 1-263.
Littlewood et al., A Bayesian Reliability Growth Model for Computer Software, Wiley, Journal of the Royal Statistical Society. Series C (Applied Statistics), vol. 22, No. 3 (1973), pp. 332-346.
Xie et al., Modeling of User Perceived Webserver Availability, IEEE 2003, pp. 1796-1800.
Zimmermann, Modeling and Evaluation of Stochastic Petri Nets With TimeNET 4.1, 2012 6th International ICST Conference on Performance Evaluation Methodologies and Tools (VALUETOOLS), pp. 54-63.
Janakiraman et al., Automated Multi-Tier System Design for Service Availability, 2003, pp. 1-7.
Immonen et al., Survey of reliability and availability prediction methods from the viewpoint of software architecture, Jan. 2007, Springer-Verlag 2007, pp. 49-65.
Kanso, Automated Configuration Design and Analysis for Service High-Availability, Thesis, Concordia University, May 2012, pp. 1-263.
Kanso et al., Generating AMF Configurations from Software Vendor Constraints and User Requirements, 2009, pp. 1-8.
Service Availability Forum Application Interface Specification, SAI-AIS-AMF-B.04.01, Availability Management Framework, Sep. 30, 2011, 452 pages.
Service Availability Forum Application Interface Specification, SAI-AIS-SMF-A.01.02, Software Management Framework, Sep. 30, 2011, 174 pages.
PCT Search Report from corresponding application PCT/IB2015/051823.

* cited by examiner

COMPONENT FAILOVER

SU RESTART

SU FAILOVER

| | |
|---|---|
| ▲ ⓔ uiAdministrativeDomain | |
|     ⓐ magicUiAdminDomainName | myWebServiceApplication |
|   ▲ ⓔ magicUiSgTemplateSiTemplates | |
|     ⓐ magicUiSiTempName | Web_Service_SI_Template |
|     ⓐ magicUiSiTempSvcType | web service |
|     ⓐ MagicUiCRMinimumSA | 0.999 |
|     ⓐ magicUiRegSiTempNumberofSIs | 12 |
|     ▲ ⓔ magicUiSiTempCsiTemplates | |
|       ⓐ magicUiCsiTempName | FTP_CSI_Template |
|       ⓐ magicUiCSiTempNumberofCsis | 5 |
|       ⓐ magicUiCsiTempCsType | FTP |
|     ▲ ⓔ magicUiSiTempCsiTemplates | |
|       ⓐ magicUiCsiTempName | HTTP_CSI_Template |
|       ⓐ magicUiCSiTempNumberofCsis | 5 |
|       ⓐ magicUiCsiTempCsType | HTTP |
| ▲ ⓔ uiClusterInfo | |
|     ⓐ numberOfNodes | 5 |

FIG. 11

| | |
|---|---|
| ▲ ⓔ Application_Type | |
|   ⓐ magicEtfApptName | Web Server AppType |
|   ▲ ⓔ SGT_A | |
|     ⓐ magicEtfSgtName | Web Server SGType |
|     ⓐ magicEtfSgtRedundancyModel | SA_AMF_N+M_REDUNDANCY_MODEL |
|     ▲ ⓔ SUT_A | |
|       ⓐ magicEtfSutName | Web Server SUType |
|       ▲ ⓔ FTP_CT | |
|         ⓐ magicEtfCtName | FTP CompType |
|         ⓐ MTTF | 53000 |
|         ⓐ MTTR | 8.20 |
|         ▲ ⓔ CST | |
|           ⓐ magicEtfCstName | FTP CST |
|           ⓐ ActiveCapability | 5 |
|           ⓐ StandbyCapability | 5 |
|       ▲ ⓔ HTTP_CT | |
|         ⓐ magicEtfCtName | HTTP CompType |
|         ⓐ MTTF | 67000 |
|         ⓐ MTTR | 6.65 |
|         ▲ ⓔ CST | |
|           ⓐ magicEtfCstName | HTTP CST |
|           ⓐ ActiveCapability | 3 |
|           ⓐ StandbyCapability | 3 |

FIG. 12

AVAILABILITY-ESTIMATE BASED CONFIGURATION GENERATION

CROSS-REFERENCE TO RELATED APPLICATIONS

This application claims the benefit of U.S. Provisional Application No. 61/955,535 filed on Mar. 19, 2014 and U.S. Provisional Application No. 62/018,788 filed on Jun. 30, 2014.

TECHNICAL FIELD

Embodiments of the invention relate to the generation of a system configuration based on the estimation of availability.

BACKGROUND

Service outage in today's technological world can result in catastrophic damages or financial and reputation loss. Service Availability (SA) is defined as the percentage of time the service is provided even in the presence of inevitable failures in the system. SA is typically achieved by using redundant resources (e.g., components) in the system and managing these redundant resources through repair and recovery mechanisms.

The Service Availability Forum (SA Forum), a consortium of communications and computing companies has developed a set of standard application programming interfaces (APIs) to enable the development of commercial-off-the-shelf (COTS) components based highly available systems. Among the set of middleware services standardized by the SA Forum, the Availability Management Framework (AMF) has the role of ensuring the availability of services of a component-based clustered system. The AMF achieves this task by managing the redundant resources and re-assigning the workload of a faulty component to healthy ones. For this, AMF uses a configuration (i.e., AMF configuration) that describes the logical organization of the application components and their services. The design of an AMF configuration is a complex and error prone task.

For a given set of configuration requirements, different configurations can be generated in the configuration generation process based on the different choices made at each decision point. However, some of these configurations may not meet the availability requirement. Some of the earlier AMF configuration generation methods either generate a single configuration, or generate multiple configurations to satisfy the same requirements as the possible options are explored in a combinatorial manner. In the former case the single configuration may not be optimal, whereas in this latter case all of the generated configurations need to be evaluated to find the one best suiting the configuration requirements. This evaluation is resource extensive and may not even be possible for complex configurations.

SUMMARY

According to one embodiment, a method performed by a system is provided for generating a configuration for a service provider system to provide a highly available (HA) service. The method comprises: identifying type stacks that provide the HA service and one or more component types in each type stack, wherein each type stack is a combination of prototypes that describe features and capabilities of available software providing the HA service; estimating, for each component type in the type stacks, a mean-time-to-recover (MTTR) of the HA service based on time for completing an actual recovery action in response to a component failure; estimating service availability provided by each type stack based on the MTTR and a mean-time-to-failure (MTTF) of each component type in the type stack; and eliminating one or more of the type stacks that do not satisfy a requested service availability before proceeding to subsequent steps of configuration generation.

According to another embodiment, a system is provided for generating a configuration for a service provider system to provide an HA service. The system comprises a memory and one or more processors coupled to the memory. The one or more processors are adapted to: identify type stacks that provide the HA service and one or more component types in each type stack, wherein each type stack is a combination of prototypes that describe features and capabilities of available software providing the HA service; estimate, for each component type in the type stacks, an MTTR of the HA service based on time for completing an actual recovery action in response to a component failure; estimate service availability provided by each type stack based on the MTTR and an MTTF of each component type in the type stack; eliminate one or more of the type stacks that do not satisfy a requested service availability before proceeding to subsequent steps of configuration generation.

According to yet another embodiment, a system is provided for generating a configuration for a service provider system to provide an HA service. The system comprises: an identification module adapted to identify type stacks that provide the HA service and one or more component types in each type stack, wherein each type stack is a combination of prototypes that describe features and capabilities of available software providing the HA service; an MTTR estimation module adapted to estimate, for each component type in the type stacks, an MTTR of the HA service based on time for completing an actual recovery action in response to a component failure; a service availability estimation module adapted to estimate service availability provided by each type stack based on the MTTR and an MTTF of each component type in the type stack; and an elimination module adapted to eliminate one or more of the type stacks that do not satisfy a requested service availability before proceeding to subsequent steps of configuration generation.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 11 illustrates example configuration requirements for an availability-estimate based entities creation method according to one embodiment.

FIG. 12 illustrates an example of created AMF types.

DETAILED DESCRIPTION

Figure 1:
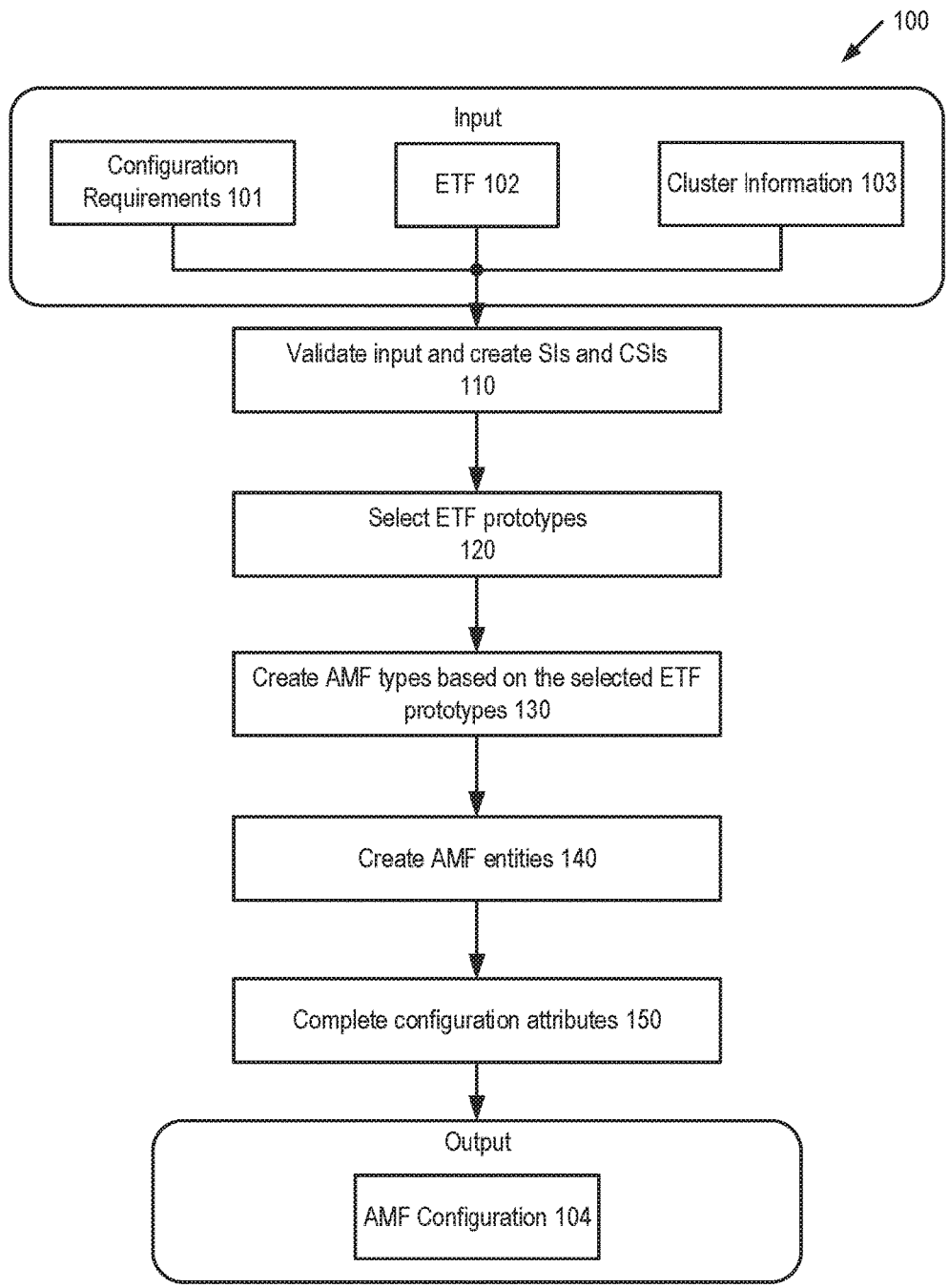
FIG. 1 illustrates the overall steps of an AMF configuration generation process according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide methods and systems for generating configurations that support a requested level of service availability. In one embodiment, an availability-estimate based method is provided. Using the method in the configuration generation process, entity prototypes that cannot provide the requested service availability are eliminated to reduce the number of configurations to be considered in the configuration generation.

The availability-estimate based method is a quantitative method that estimates service availability based on partial configuration information. This estimate can then be used at earlier stages of the configuration generation process to prioritize or eliminate configuration options. The method eliminates the prototypes arrangements (also referred to as type stack(s)) that would lead to configurations that cannot satisfy the availability requirements. Subsequently, the configuration generation process proceeds only for the type stack(s) that has the potentiality of achieving the requested service availability. Thus, only those configurations that are expected to guarantee the requested availability characteristics are generated. The method avoids the use of full-fledged availability analysis methods and tools that are resource and time consuming and may not be solvable for complex models.

Before describing the availability-estimate based method, it is helpful to explain some terminologies used in the context of AMF. An AMF implementation manages the availability of application services based on a configuration, which is the logical organization of the application's services and components.

A component is the smallest logical entity in the system, on which AMF performs error detection, isolation and repair. A component represents a specific resource such as a process, which is capable of providing a set of functionalities of an application.

To provide a given functionality at runtime, AMF assigns a component service instance (CSI) to the component which represents an associated workload. Higher level services are combinations of these functionalities and they are represented in the AMF configuration as service instances (SIs). Accordingly, one or more components that collaborate to provide an SI are placed together to compose a service unit (SU). Hence, an SI is the workload assigned to an SU at the runtime.

An SI can be assigned to an SU in the active or standby state. Active means that the SU is the primary service provider for that SI, whereas standby means that the SU is acting as secondary (redundant) entity for that SI. An SU may have no or many assignments. If it has no assignment it is a spare SU. Redundant SUs protecting the same set of SIs are grouped together to form a service group (SG) to guarantee the service availability. Each SG is constructed according to a redundancy model. There are five different redundancy models: 2N, N+M, Way, Way-Active, and No-Redundancy. Each of them has their own characteristics with respect to the number of active and standby assignments an SI may have and the distribution of these assignments among the service units within the service group. For example, in a 2N redundancy model, each SI has an active and a standby assignment and only one SU takes all the active assignments and another one the standbys. Whereas in the Way-Active redundancy model, the SIs have many active, but no standby assignments assigned to different SUs. A set of SGs form the AMF Application. The SUs are deployed on nodes that together form a cluster.

Except for the node and cluster, the logical entities described before are all typed entities. A type reflects and encapsulates the common characteristics that its instances share due to the common software implementation used to instantiate them.

The AMF types are primarily derived from the prototypes that one or more software vendors provide to describe the features and limitations of their implementation. The AMF types respect the constraints imposed by the prototype from which they are derived. The software vendor describes the software in terms of prototypes in an Entity Types File (ETF) This description may include such characteristics as the component capability with respect to each functionality, the minimum and maximum number of component instances a SU may contain, and the different dependencies. Currently the following prototypes have been defined for an ETF.

Component Service Type (CSType): The CSType specifies the attributes that characterize a particular workload that can be assigned to a component.

Service Type (SvcType): A SvcType specifies how CSTypes can be combined.

Component Type (CompType): A CompType describes the characteristics of a specific version of a software implementation that can be used to instantiate components. Most importantly, the CompType defines the CSTypes such components can provide along with the dependencies among them. The CompType also specifies some other characteristics, for example, if such a component can be restarted to recover its services.

Service Unit Type (SUType): An SUType limits the combination of CompTypes, and accordingly it lists the SvcTypes that can be provided using instances derived from it. Any limitation on the number of instances of a particular CompType within the SUType is defined as a range value. The SUType may also specify that in case of a component failure the entire SU is to fail.

Service Group Type (SGType): The SGType limits what SUTypes can be used to build a SG of this SG prototype. It also determines the redundancy model for its instances. Using an SGType, the vendor can recommend the attribute settings for the failure escalation policies; e.g., the maximum number of times the components of an SU can fail within the probation period before the whole SU is restarted, and the maximum number of times that an SU can be restarted before it is failed over.

Application Type (AppType): The AppType limits the SGTypes that can be used in its instances.

An ETF describing a software implementation contains at least the CompTypes and the CSTypes. The other prototypes are used when the software vendor wishes to constraint the way the software is deployed (e.g., CompTypes A and B are to be collocated in the SUType). Otherwise all combinations and attribute settings are allowed.

FIG. 1 illustrates a configuration generation process 100 according to one embodiment. The input for generating an AMF configuration includes configuration requirements 101, ETF 102 and cluster information 103. The configuration requirements 101 describe the services to be provided the system, the ETF 102 describes the available software, and the cluster information 103 describes the deployment cluster. After validating the input, the process 100 generates SIs and CSIs (block 110) and proceeds to the following configuration generation steps: ETF prototypes selection (block 120); creation of AMF types from the selected ETF prototypes (block 130); creation of AMF entities for the AMF types (block 140) and setting the attributes of AMF entities and their allocation to cluster nodes (block 150). The output of the process 100 is an AMF configuration 104.

The first step in the configuration generation process 100 is the ETF prototype selection (block 120). This step finds all the ETF prototypes that can satisfy the input configuration requirements. For instance, for a given administrative domain, one or more application prototypes may provide the requested services through one or more SG prototypes. In this case for each possible combination of prototypes that satisfies the requirements, a stack of prototypes is built that contains a set of component prototypes at the bottom. The component prototypes may be grouped by SU prototypes that in turn may belong to SG prototypes that finally may belong to some application prototypes. Based on how many suitable candidate prototypes are available at each level, multiple type stacks may be built. Some of the stacks may be incomplete; that is, contain only the prototypes for the lower layers.

Figure 2:
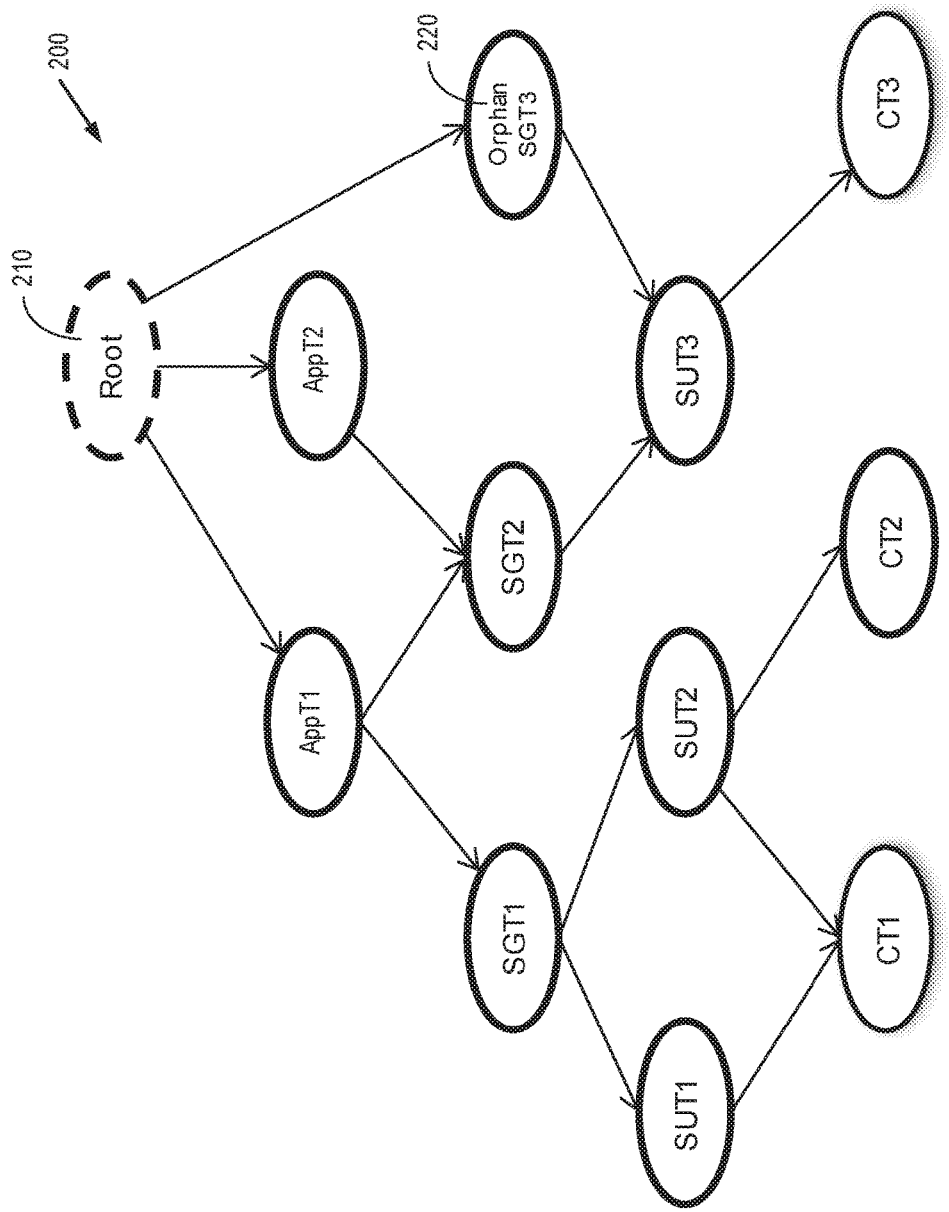
FIG. 2 illustrates an example of an Entity Types File (ETF) model according to one embodiment.

In one embodiment, the available collection of ETF prototypes can be represented as a disconnected non-ordered directed acyclic graph (DAG) 200 as shown in the example of FIG. 2. The DAG 200 represents an ETF model. The nodes of the DAG 200 represent ETF prototypes, whereas the edges represent the relations among these prototypes. The Root 210 represents the requested service. The DAG 200 is constructed from the ETF files (e.g., the ETF 102 of FIG. 1), each file describing one or more component prototypes with their services and their possible organization into an application prototype. Except for the application prototypes (e.g., AppT1 and AppT2), all other prototypes may have more than one parent prototype (e.g., an SUType (SUT3) may be used in more than one SGType (SGT2 and Orphan SGT3 230)); and since not all prototypes are mandatory in an ETF, any prototype may have the Root 210 as its parent; e.g., Orphan SGT3 220.

As it can be seen, while an AppType has only one parent, the Root 210, other prototypes may have more than one; e.g., SUT3 can be used to build instances of SGT2 or SGT3. Some prototype may be missing; e.g., SGT3 can be used for any AppType other than AppT1, which specifies that only SGT1 and SGT2 can be used in its instances.

Often more than one suitable prototypes or combination of them can be found in the ETF model. In the example EFT model of FIG. 2, there are multiple prototype hierarchies, each starting at the Root 210 all the way to a component prototype. Each of these prototype hierarchies is referred to as a type stack.

Figure 3:
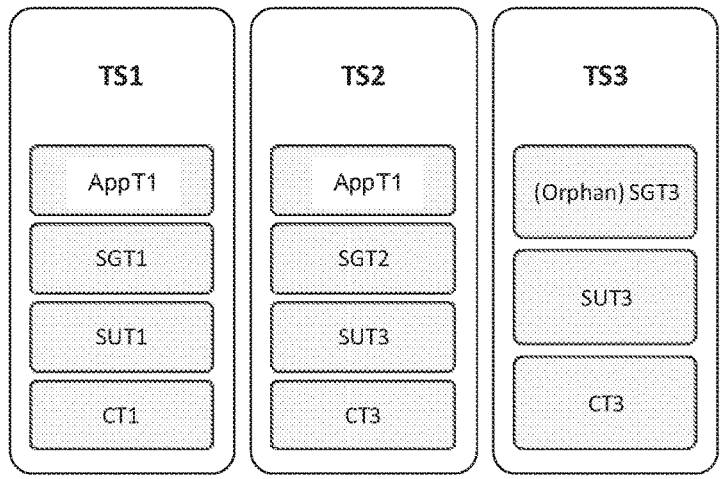
FIG. 3 illustrates an example of three different type stacks according to one embodiment.

Based on the ETF model example shown in FIG. 2, several different AMF configurations can be created that will be able to provide the requested service (represented by the Root 210). FIG. 3 illustrates an example of three of these different type stacks. These type stacks are passed onto the next step of the configuration generation process, the AMF type creation.

Referring again to FIG. 1, the second step of the configuration generation process 100 is AMF type creation (block 130). In this step of the configuration generation, the selected ETF prototype stacks are processed and the corresponding AMF types are derived. If there was no prototype selected for an AMF type, one is created. The attributes of the AMF types are constrained by the attributes of the ETF prototypes from which they are derived. In this respect some attributes are to be set as provided in the prototype, while others are changeable. Accordingly, if the ETF prototype specifies a particular value, this value is used in the AMF type. Changeable attributes are set according to applicable configuration design patterns. If there is no applicable configuration design pattern for a changeable attribute, the default provided by the ETF prototype can be used. If no default is specified, the applicable default defined by the AMY specification can be used. It is understood that other attribute settings may also be valid and may be used.

The third step of the configuration generation process 100 is AMF entities creation (block 140). Once the AMF types have been created, their corresponding AMF entities are created and configured for the system. For this, first the number of instances for each AMF entity type is determined. When the AMF entities are created, for each AMF type the number of entities is not fixed, but can be selected from a range. This number takes into account the configuration requirements as well as all the constraints imposed by their AMF type.

The fourth step of the configuration generation process 100 is completing the configuration attributes (block 150). This last step of the AMF configuration generation process sets the attributes that determine the distribution of the AMF entities (e.g., SUs) among the nodes of the cluster. The step aims at providing an even distribution so that at runtime the load will be balanced in the AMF cluster.

At each of the steps described above there are multiple options which lead to multiple valid configurations. For example, multiple ETF prototypes may be available to provide the same service and can be selected in the first step (block 120); from the same ETF prototype, multiple AMF types can be derived in the second step (block 130); different numbers of AMF entities can be created for the same AMF type in the third step (block 140) and the fourth step (block 150); and the AMF entities can be distributed in many ways in the fourth step (block 150).

The difficulty of the configuration generation task lies in that in each step the choices are made based on some criteria, but not all the criteria. Accordingly, some options selected by some criteria may lead to no result as they are pruned later by other criteria, other options that are pruned early by some criteria may improve significantly by later choices and become the solution if they were not pruned.

The availability-estimate based method estimates the service availability that can be achieved by a configuration. This estimate is used to eliminate prototypes that cannot meet the availability requirements for the system, and to generate only the configurations that satisfy the requested level of availability. For those configurations that satisfy the requested level of availability, the method determines the number of redundant entities in the configuration. Thus, the method is applied at two steps of the configuration generation process 100. In the first step (block 120) at the type selection, the type stacks that cannot guarantee the requested service availability are eliminated based on the availability estimates. In the third step (block 140) of AMF entities creation, AMF entities are generated based on these estimates such that the generated entities satisfy the requested service availability.

In one embodiment, two factors are used to determine the service availability of a system: Mean Time To Repair (MTTR) and Mean Time To Failure (MTTF) of its composing components. The MTTF is the average time between two consecutive failures, whereas the MTTR refers to the average time to repair the component, so that it can provide the service again. For the method described herein, the MTTF of a component is considered as a constant failure rate provided by the vendor for the CompType from which the component is derived. Thus, only the MTTR is to be estimated. Considering the redundancy of components, repair means the repair of the service rather than the component.

The recommended recovery of the CompTypes and other configuration attributes determine how the service is recovered after a component failure. To estimate the MTTR, the recommended recovery actions of the components are analyzed in the context of the configuration to determine what actual recovery actions will be taken by AMF at runtime in case of a failure. Based on this actual recovery action, the time needed to complete the associated procedures is estimated. With the MTTR and the failure rates of the components involved, the service availability can be estimated.

The estimation is performed before a configuration is generated, that is, when the information is only partial. Thus, assumptions are made about the configuration based on the ETF prototypes selected in each type stack. In one embodiment, the assumptions (A1-A5) include the following: (A1) it is assumed that in each SU there is one component for each CompType that is needed to provide the service. (A2) It is assumed that there is an identical (i.e., derived from the same SUType) redundant SU hosted on a redundant node that can take over the service assignment when necessary.

(A3) It is also assumed that there is more than one assignment for an SI protected by the Way-Active redundancy model. Thus, no outage time for such a service is considered. (A4) It is also assumed that if the instantiation or the clean-up of a component fails, node reboot is performed. That is, it is assumed that saAmfNodeFailfastOnInstantiationFailure is set to True, and saAmfNodeFailfastOnTerminationFailure is set to True. Finally, in the following description, it is first assumed that (A5) there are no dependencies among the components; this assumption is removed later.

Details of the estimation method are described in the following with respect to actual recovery analysis and recovery time estimation.

One important configuration attribute that determines the actual recovery action taken by AMF in response to a component failure is the recovery action configured for the faulty component. This is configured based on the recommendation provided by the vendor in the corresponding CompType. For a CompType, there may be any of the following recommended recovery actions defined in the AMF specifications: No Recommendation, Component Restart, Component Failover, Container Restart, Node Switchover, Node Failover, Node Failfast, Application Restart, or Cluster Reset. When AMF detects a component failure, it checks the applicable recommended recovery action of the component, and it also checks all the other configuration attributes that can alter this recommendation. Then AMF determines the actual recovery action that it will execute.

There are several configuration attributes that can change the recommended recovery action. For instance, the component restart recommendation is altered if the restart option for the component is disabled for the component itself or any of its parenting entity (e.g., SG). If AMF cannot perform the component restart and the actual recovery action will be escalated to the parent SU level (i.e., SU restart or SU failover). Thus, the recovery recommendations are analyzed for all the CompTypes in the context of their type stack and the applicable actual recovery actions are determined.

After determining the actual recovery action for a CompType, the time it takes to complete this recovery action can be estimated. Considering a recovery action, the availability-estimate based method determines the procedures it involves and their timing to estimate the needed time for completing the recovery action.

The following description first explains the estimation of the recovery times for the component restart, component failover, SU restart and SU failover actual recovery actions. Subsequently, it is explained how the calculation can be applied to other recovery actions.

AMF accomplishes all its tasks through managing the components of the system under its control. Accordingly, all recovery actions except for node failfast can be decomposed into a combination of recovery actions applicable to components, which are: component restart, component failover, and the component switchover. These component level recovery actions can be further decomposed into a sequence of component life-cycle and API callback operations. Table I presents the decomposition of the different component level recovery actions.

TABLE I

Decomposition of component level recovery actions into component life-cycle and API callback operations

| Recovery Action | Operations Decomposition |
| --- | --- |
| Component Restart | Cleanup of the (faulty) component + Instantiation of the component + Set the assignment of the component to active |
| Component FailOver | Cleanup of the faulty component + Set assignment of the standby component to Active |
| Component Switch Over | Set assignment of the active component to Quiesced + Set assignment of the standby component to Active |

An actual recovery action is first decomposed into the operations in Table I for estimating the time for its completion. All the operations in Table I are guarded by timers. These timers determine the maximum time that AMF waits before it considers the operation unsuccessful. Therefore, the timeout values of these timers are used to estimate the recovery time.

In the following, the details of the recovery time estimation are presented for the different actual recovery actions. The abbreviations defined in Table II are used hereinafter. Table II also lists the ETF and AMF attributes where they are applicable. The attribute set in italic is expected as input with ETF or as AMF system attribute.

TABLE II

List of abbreviations

| Abbreviation | Definition |
| --- | --- |
| AOT | Average outage time of component instantiation |
| AOTIWOD | Average outage time for instantiation attempts without delay |
| AOTIWD | Average outage time for instantiation attempts with delay |
| CIT | Clean-up timeout for a component (saAmfCompCleanupTimeout, saAmfCtClcCliTimeout, defaultClcCliTimeOut) |
| CSS | Timeout of the CSI set callback to the component (saAmfCompCSISetTimeout, saAmfCtCallbackTimeout, defaultCallbackTimeOut) |
| d | Delay between instantiation attempts (saAmfCompDelayBetweenInstantiateAttempts, saAmfDelayBetweenInstantiateAttempts) |
| FOT | Failover time of the faulty component |
| IT | Instantiation timeout for a component (saAmfCompInstantiateTimeout, saAmfCtClcCliTimeout, defaultClcCliTimeOut) |
| n | Total number of instantiation attempts (NIWOD + NIWD) |
| NST | Node Shutdown Time (The time that a node takes to go down) |
| NCF | Outage caused by abrupt node reboot (i.e. node failfast) |
| NIWOD | Number of instantiation attempts without delay (saAmfCompNumMaxInstantiateWithoutDelay, saAmfNumMaxInstantiateWithoutDelay) |
| NIWD | Number of instantiation attempts with delay(saAmfCompNumMaxInstantiateWithDelay, saAmfNumMaxInstantiateWithDelay) |
| OIF | Outage time for the case when all the instantiation attempts fail |
| PCS | Probability of the successful component clean-up |
| PCNS | Probability of the unsuccessful component clean-up (i.e. 1-PCS) |
| PIS | Probability of the successful instantiation without delay |
| PINS | Probability of the unsuccessful instantiation without delay (i.e. 1-PIS) |
| PISD | Probability of the successful instantiation with delay |
| PINSD | Probability of the unsuccessful instantiation with delay (i.e. 1-PISD) |
| SOT | Switchover time of the components of the SU |

Figure 4:
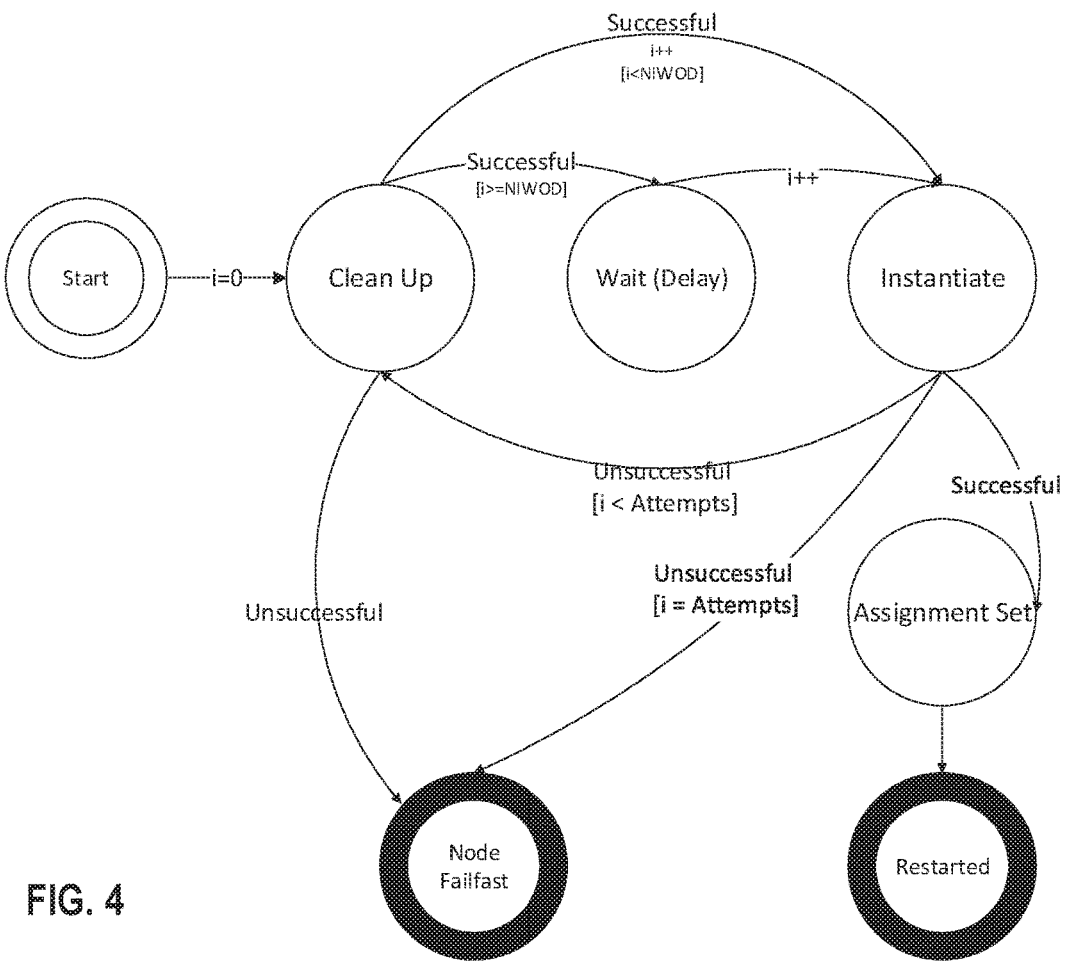
FIG. 4 illustrates an example of a component restart recovery action according to one embodiment.

A first actual recovery action is the component restart. FIG. 4 illustrates a procedure of a component restart recovery action according to one embodiment. As illustrated, the component restart recovery action starts with cleaning up the faulty component. If the cleanup is successful, then AMF tries to re-instantiate the component. Once the component is instantiated successfully, AMF sets the component's assignments as requested to recover the services to complete the component restart recovery action. If unsuccessful, AMF will attempt to instantiate the component a number of times without any delay between the attempts, followed by attempts with delays between them. In the availability estimation, it is assumed that the cleanup and instantiation commands have their own success probability. The number of instantiation attempts without delay (NIWOD) and the number of instantiation attempts with delay (NIWD) are expected input to the configuration generation process.

A component restart recovery action fails if AMF fails to clean up the component or if the instantiation fails after all the allowed attempts. In these cases, it is assumed that AMF reboots the node hosting the component and all the assignments of the node are failed over to the standbys nodes (i.e., the nodes on which the components with the standby assignments reside).

It is considered that the instantiation and the clean-up actions fail with certain probabilities. These probabilities are provided as input for the CompTypes. Accordingly, based on the described procedure, the time for the component restart recovery action can be estimated.

Figure 5:
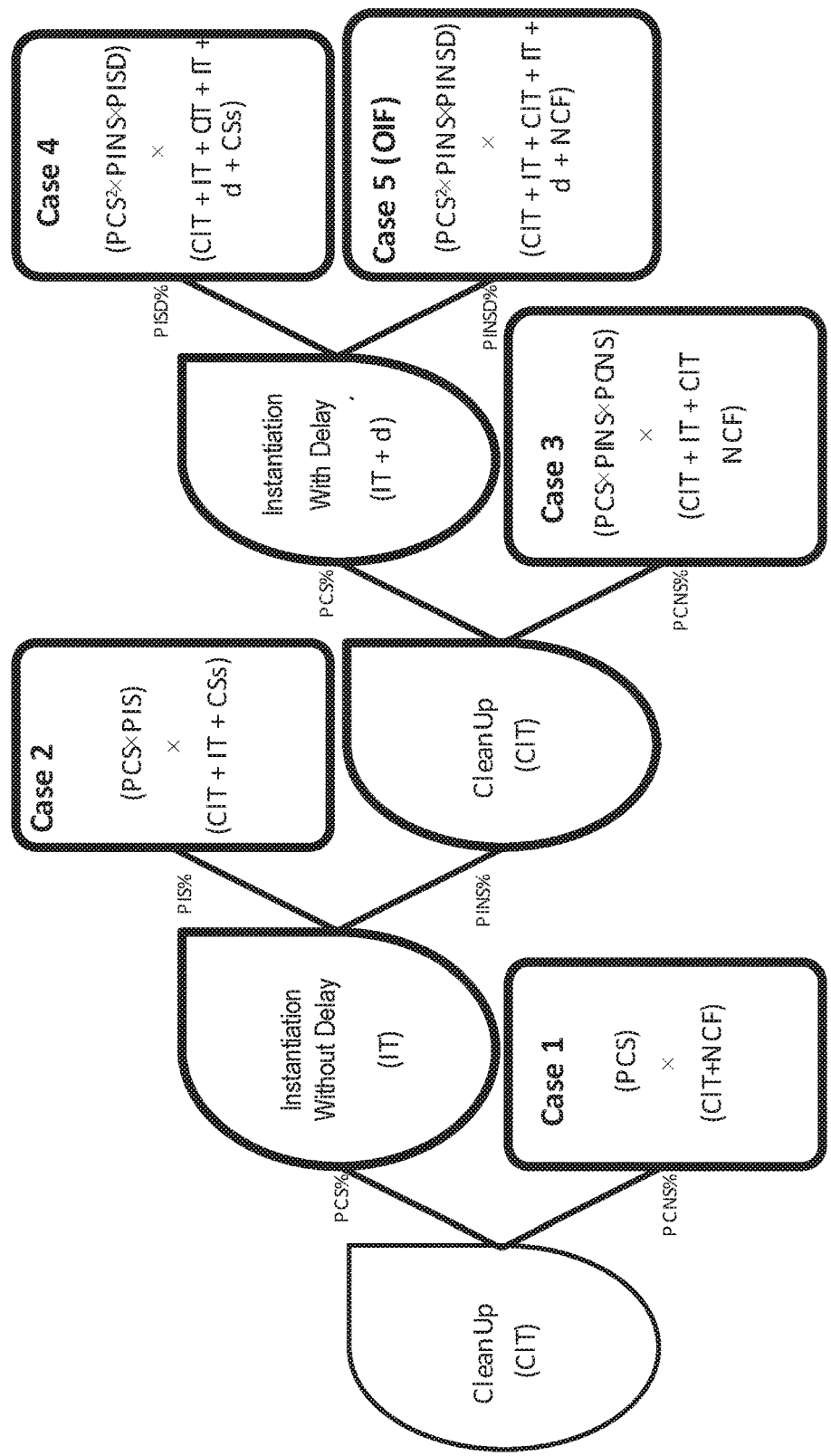
FIG. 5 illustrates alternative cases of a component restart recovery action according to one embodiment of the invention.

FIG. 5 illustrates an example of the possible (i.e., alternative) cases of a component restart recovery action according to one embodiment. In this example, only a single attempt is allowed for instantiation without delay as well as with delay.

In order to find the average recovery time, the recovery time for each case is determined using a tree diagram, with each case represented by a leaf of the tree. The tree for the example has five leaves. The leaves representing Case 2 and Case 4 are the cases where the component restart recovery action is successful. The other leaves, Case 1, Case 3 and Case 5 correspond to the cases where the component restart recovery action fails and the failure is escalated to the node level. As a result, all the assignments of the node are to be failed over.

In the following description, the availability estimate calculation is performed by a system executing an embodiment of the availability-estimate based method. Embodiments of the system will be described in connection with FIG. 16 and FIG. 17.

For each case, the system calculates the value of its probability based on the probabilities of the individual operations involved and the time that it takes based on their associated timeouts. For instance, the probability of Case 2 is equal to PCS×PIS, which represents the probability of a successful cleanup action multiplied by a successful instantiation attempt. Additionally, the time needed to complete each case, is the time it takes for all of the (unsuccessful) consecutive actions prior to that case, and the time needed for the current action (e.g., CSS, NCF, IT). As it can also be seen in the example, the average recovery time (i.e., outage time) for the component restart recovery action is equal to the summation of all of the probable cases.

According to one embodiment, as part of the component restart recovery action estimation, first the NCF is calculated, which represents the outage caused by an abrupt node reboot (i.e., node failfast) followed by the failover the CSIs assigned to the hosted components. The latter operation AMF executes concurrently; therefore, the maximum of the CSI set timeouts applicable is used. The NST is an input parameter for the system. Therefore NCF is calculated by Eq. (1) as:

$$NCF = NST + \text{Max}_{1 \leq j \leq N}(CSSj) \quad (1)$$

Eq. (2) below can be used to calculate the average outage time due to the component instantiation attempts without delay, as part of the component restart action estimation.

$$AOTIWOD = \sum_{i=1}^{NIWOD} [(PCS^i \times PINS^{i-1} \times PIS) \times ((i \times (CIT + IT)) + CSS)] + \sum_{i=1}^{NIWOD} [(PCS^{i-1} \times PINS^{i-1} \times PCNS) \times ((i \times CIT) + ((i-1) \times IT) + NCF)] \quad (2)$$

In Eq. (2) the term $(PCS^i \times PINS^{(i-1)} \times PIS)$ represents the probability of the $i^{th}$ successful case while $(PCS^i \times PINS^{(i-1)} \times PCNS)$ represents the $i^{th}$ unsuccessful case. To calculate the outage, these probabilities are multiplied by the respective time values, which are expressed by the terms $((i \times (CIT+IT))+CSS)$ and $((i \times CIT)+((i-1) \times IT)+NCF)$.

Similarly, according to one embodiment, Eq. (3) calculates the average outage time due to the component instantiation attempts with delay. In this equation, the term $PINS^{NIWOD}$ calculates the probability that all instantiation attempts without delay were unsuccessful.

$$AOTIWD = PINS^{NIWOD} \times \left[ \begin{array}{c} \sum_{i=NIWOD+1}^{n} \left[ \begin{array}{c} (PCS^i \times PINSD^{(i-NIWOD-1)} \times PISD) \times \\ ((i \times (CIT + IT)) + ((i - NIWOD) \times d) + CSS) \end{array} \right] + \\ \sum_{i=NIWOD+1}^{n} \left[ \begin{array}{c} (PCS^{i-1} \times PINSD^{(i-NIWOD-1)} \times PCNS) \times ((i \times CIT) + \\ ((i-1) \times IT) + ((i - NIWOD - 1) \times d) + NCF) \end{array} \right] \end{array} \right] \quad (3)$$

As mentioned, it is possible that all the instantiation attempts made by AMF fail. In such a case, the average outage time can be calculated using Eq. (4) according to one embodiment.

$$OIF = PCS^n \times PINS^{NIWOD} \times PINSD^{NIWD} \times [(n \times (CIT+IT)) + (NIWD \times d) + NCF] \quad (4)$$

The average outage time caused by the component restart recovery action is the sum of the partial time estimates defined by Eq. (2), Eq. (3) and Eq. (4). The estimated total recovery time for the component restart is given in Eq. (5) according to one embodiment.

$$MTTR = AOTIWOD + AOTIWD + OIF \quad (5)$$

Figure 6:
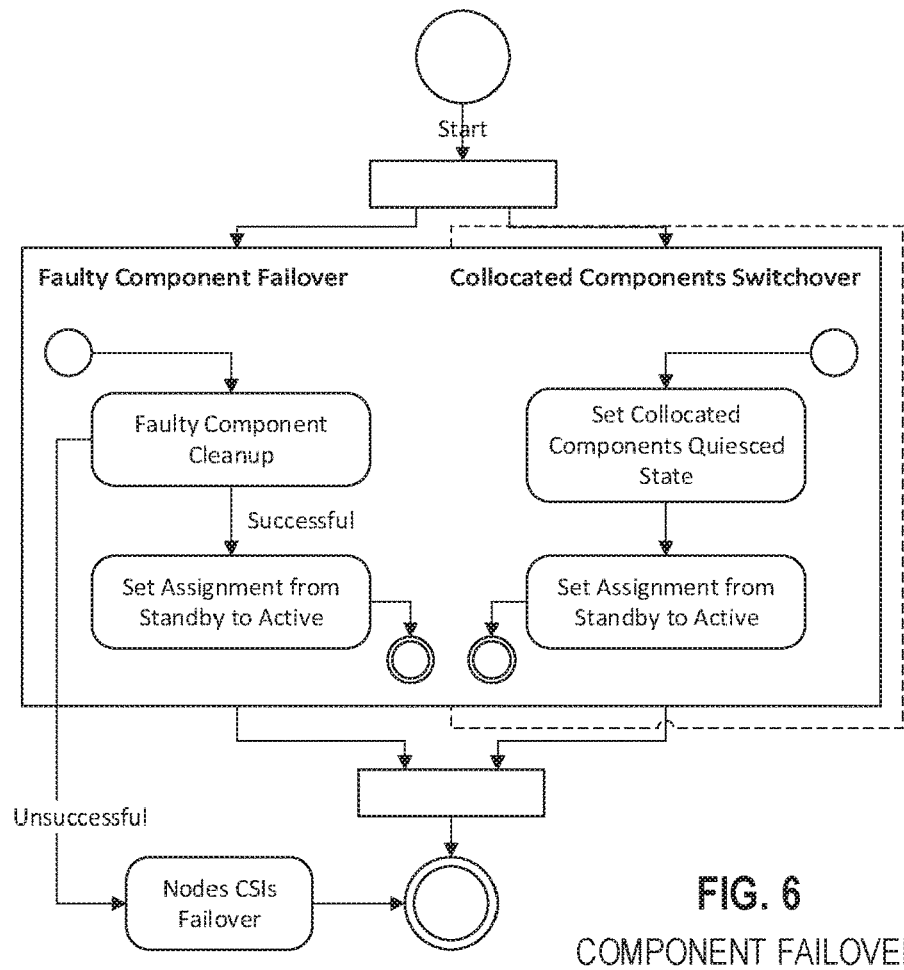
FIG. 6 illustrates an activity diagram for the component failover recovery action according to one embodiment.

A second actual recovery action is the component failover. A component failover recovery action includes two operations: cleaning up the faulty component, and assigning its assignments to its healthy peers. Depending on the redundancy model and other configuration attributes, the other components of the SU of the faulty component, may be subject to a switchover or a failover of their assignments. FIG. 6 illustrates an activity diagram for the component failover recovery action according to one embodiment. The activity diagram illustrates the case when other components are switched over; i.e., AMF first changes their active assignments to quiesced, then AMF moves the active assignments to the corresponding peer components.

Figure 7:
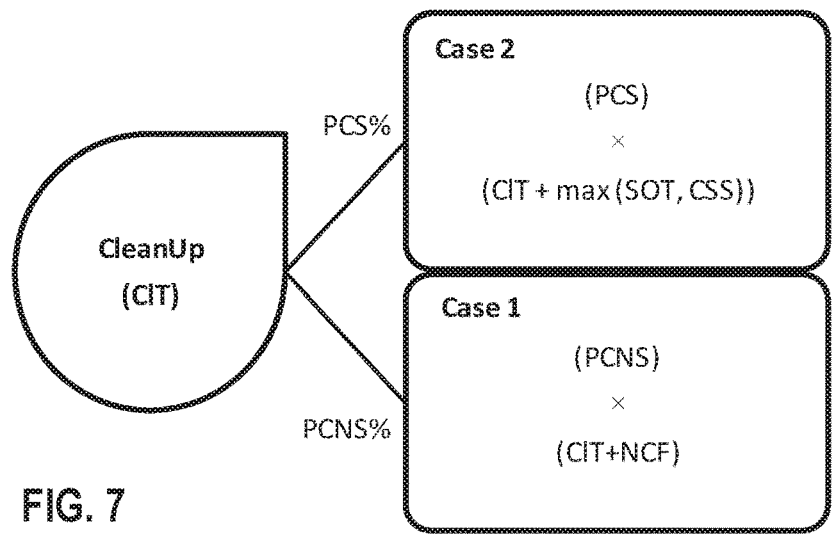
FIG. 7 illustrates an example of a component failover recovery action according to one embodiment.

FIG. 7 illustrates an example of a component failover recovery action according to one embodiment. There are two cases: Case 2 represents the successful failover recovery action, and Case 1 corresponds to the failure of the component failover resulting in to node failfast, when all assignments of the node are failed over while the node is abruptly rebooted. Note that FIG. 7 only depicts the failover action as a part of the whole failover recovery action. It does not reflect the switchover action that may be applied to the collocated components.

Accordingly, Eq. (6) can be used to estimate the failover time (FOT) of the faulty component (i.e., Case 2):

$$FOT = [PCS \times (CIT+CSS)] + [PCNS \times (CIT+NCF)] \quad (6)$$

For the other components of the SU that need to be switched over, the switch over time (SOT) is estimated by Eq. (7):

$$SOT = 2 \times \text{Max}_{1 \leq j \leq N}(CSSj) \quad (7)$$

where j iterates through the remaining CompTypes in the SU. $CSS_j$ is the time out guarding the callback of the state assignment for the $j^{th}$ component regardless whether the active, standby or quiesced state is being assigned. Since identical SUs are generated, the same term applies to both the quiesced assignment in the SU of the faulty component and to the active assignment in the new SU.

After the cleanup of the faulty component, AMF completes the failing over action of the faulty component, and switching over of the other components (in the same SU) concurrently. Therefore, the average recovery time (i.e., outage) for a component failover recovery action of a given CompType can be calculated as Eq. (8):

$$MTTR = [PCS \times (CIT + \text{Max}(SOT,CSS))] + [PCNS \times (CIT+NCF)] \quad (8)$$

A third actual recovery action is the SU restart. The SU restart actual recovery action is the first level of escalation of the component restart recovery recommendation. The escalation occurs if within the probation time the number of component restarts exceeds the configured threshold. In the estimations the escalation is considered only for the case when the threshold is zero (i.e., saAMFSGCompRestart-Max=0), therefore the SU restart is triggered by the first component restart.

Figure 8:
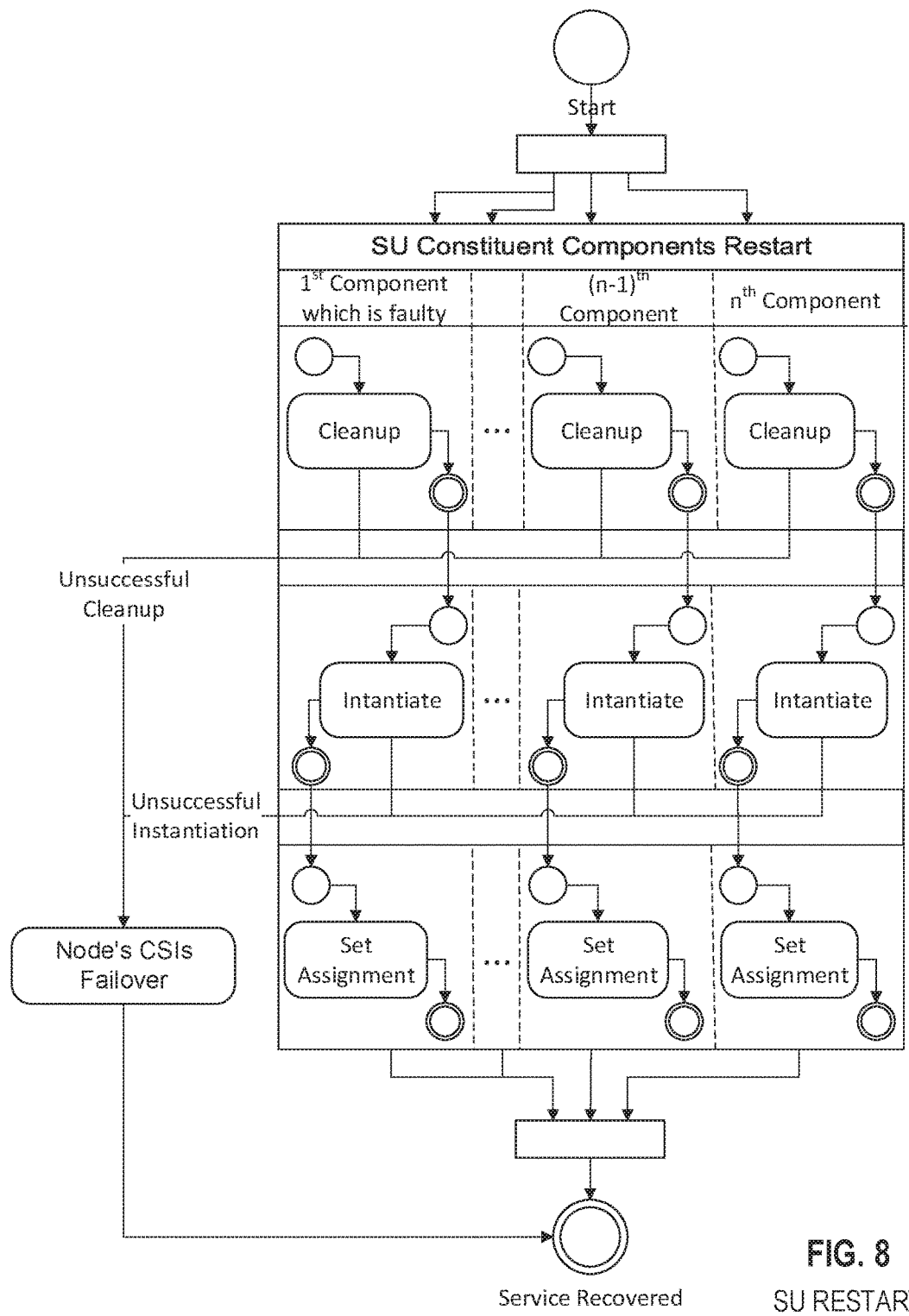
FIG. 8 illustrates an activity diagram for an SU restart actual recovery action according to one embodiment.

Conceptually, the SU restart is the restart of all its components. However, the actions need to be synchronized across the SU; that is, all the components are cleaned up first simultaneously, and if successful, then simultaneously AMF re-instantiates all of them and sets their state assignments as the components had them before the failure. FIG. 8 illustrates an activity diagram for an SU restart actual recovery action according to one embodiment.

To calculate the average recovery time, a first step is to estimate the time needed to clean up a component of each CompType in an SU using Eq. (9):

$$\text{CleanupTime} = [PCS \times (CIT)] + [PCNS \times (CIT+NCF)] \quad (9)$$

Then, a next step is to estimate the instantiation time of each component for each CompType. Thus, the average outage time for the instantiation attempts without delay is calculated as shown in Eq. (10):

$$AOTIWOD = \sum_{i=1}^{NIWOD} [(PCS^{i-1} \times PINS^{i-1} \times PIS) \times \quad (10)$$

$$((((i-1) \times CIT) + (i \times IT)) + CSS)] +$$

$$\sum_{i=2}^{NIWOD} [(PCS^{i-2} \times PINS^{i-1} \times PCNS) \times ((i-1) \times CIT) +$$

$$((i-1) \times IT) + NCF)]$$

Compared to Eq. (2), Eq. (10) does not include the first cleanup which ensures the removal of the assignments, and therefore needs to be synchronized. This is taken into account by Eq. (9).

Similarly, Eq. (11) calculates the average outage time of the instantiation attempts with delay for each CompType.

$$AOTIWD = PINS^{NIWOD} \times \quad (11)$$

$$\left[ \sum_{i=NIWOD+1}^{n} \left[ \begin{array}{c} (PCS^{i-1} \times PINSD^{(i-NIWOD-1)} \times PISD) \times ((((i-1) \times \\ CIT) + (i \times IT)) + ((i-NIWOD) \times d) + CSS) \end{array} \right] + \right.$$

$$\left. \sum_{i=NIWOD+1}^{n} \left[ \begin{array}{c} (PCS^{i-2} \times PINSD^{(i-NIWOD-1)} \times PCNS) \times \\ (((i-1) \times CIT) + ((i-1) \times IT) + \\ ((i-NIWOD-1) \times d) + NCF) \end{array} \right] \right]$$

As mentioned earlier, it is possible that all of the instantiation attempts made by AMF fail for a component; therefore, the applicable portion of the outage time for the CompType is determined by Eq. (12).

$$OIF = PCS^n \times PINS^n \times [((n-1) \times CIT) + (n \times IT) + (NIWD \times d) + NCF] \quad (12)$$

Let AOT denote the average outage time of a component instantiation for a given CompType. The AOT can be calculated by Eq. (13), which is the sum of the portions calculated by Eq. (10), Eq. (11) and Eq. (12).

$$AOT = (AOTIWOD + AOTIWD + OIF) \quad (13)$$

After the cleanup and instantiation time estimates are calculated for each CompType, the next steps is to estimate the recovery time for an SU composed of components of these CompTypes. Since the cleanup of different components is executed simultaneously, the estimation takes the maximum of cleanup and the maximum of the instantiation time, as given in Eq. (14) to estimate the average recovery time for the SU restart actual recovery. In Eq. (14), j iterates through the CompTypes (i.e., N) within the SUType.

$$MTTR = \max_{1 \leq j \leq N}(CleaupTime_j) + \text{Max}_{1 \leq j \leq N}(PCS_j \times AOT_j) \quad (14)$$

A fourth actual recovery action is the SU failover. The SU failover recovery action is executed by AMF due to the escalation of a component restart recovery recommendation (i.e., saAMFSGCompRestartMax=0 and saAMFSGSURestartMax=0), or it is the result of a component failover recommendation altered by the attribute of the parent SU, i.e., SUFailover=True.

Figure 9:
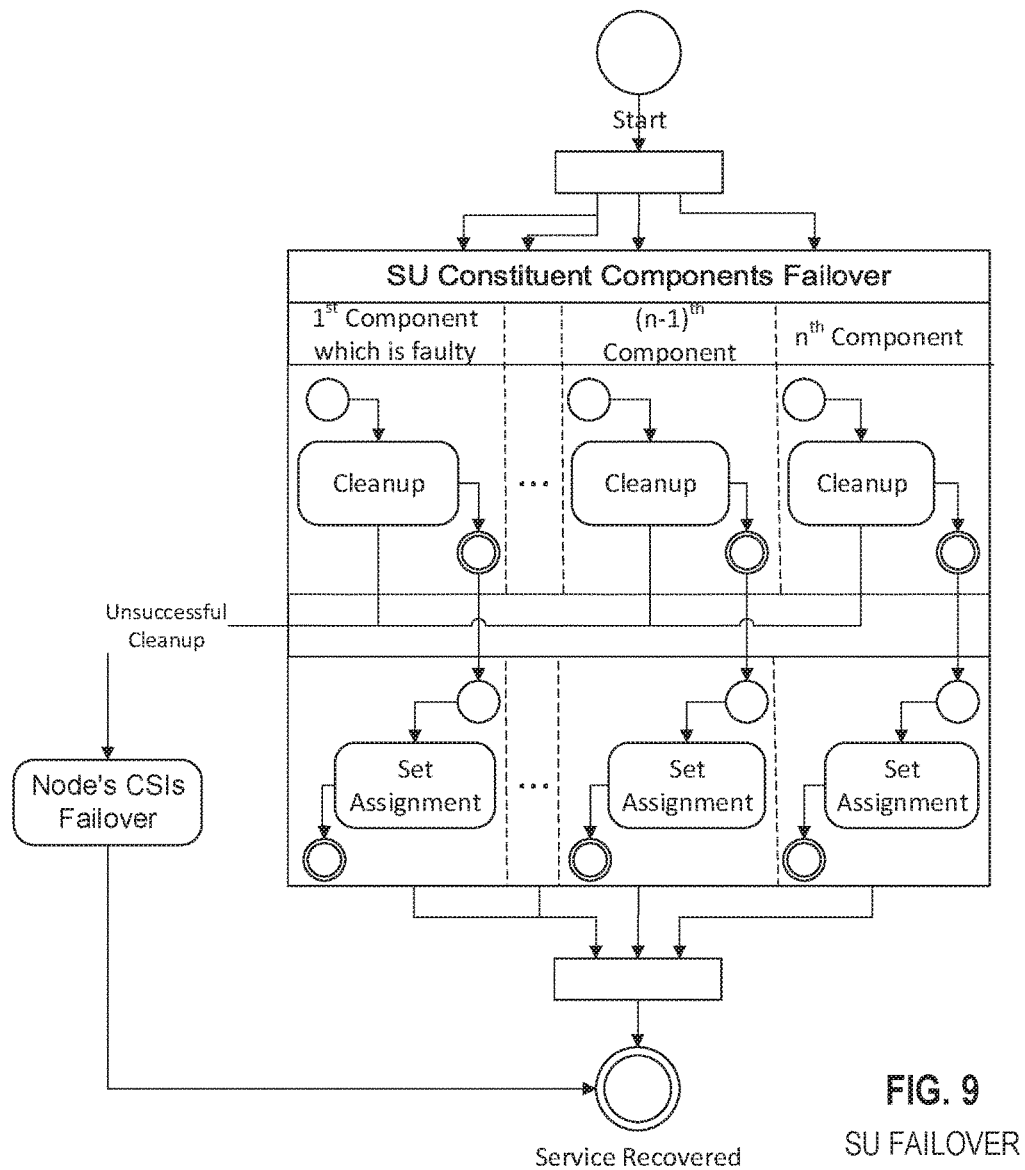
FIG. 9 illustrates an activity diagram of an SU failover actual recovery action according to one embodiment.

The SU failover actual recovery action includes the following operations: first, AMF cleans up all the components of the SU, then, if the cleanup was successful, AMF reassigns their CSI assignments to appropriate healthy peer components. FIG. 9 illustrates an activity diagram of an SU failover actual recovery action according to one embodiment.

To estimate the time for the SU failover actual recovery, a first step is to calculate the cleanup time of each CompType used in the SU using Eq. (9). The reassignments of the CSIs are guarded by the CSI set timeout (i.e., CSS). A next step is to add up the maximum of cleanup times and the maximum of the reassignment time, since each of these operations are executed concurrently as shown in Eq. (15).

$$MTTR = \max_{1 \leq j \leq N}(CleaupTime_j) + \text{Max}_{1 \leq j \leq N}(PCS_j \times CSS_j) \quad (15)$$

where j iterates through the CompTypes in the SU (i.e., N).

So far only the component and SU level recovery actions are described. The remaining recovery actions that can be recommended for a component include: node failfast, node failover, node switchover, application restart and cluster reset. These actions are to be taken into account for the recovery estimation as well.

With respect to the node level recovery actions, at the time of the ETF type selection it is not known yet the compositions of the nodes beyond the composition of the SU within which the CompType is being considered. Hence, the equivalence of these actions are determined with the already mentioned actions as follows:

The node failover recovery action is similar to the SU failover recovery action for which the estimate is given by Eq. (15). For the node all the CompTypes hosted on the node are considered. In case of node switchover, AMF fails over the faulty component but switches over the others hosted on the node. Thus, the recovery time can be estimated similar to the component failover given in Eq. (8). The node failfast recovery action has been considered in Eq. (1).

The application restart recovery action is defined as terminating the whole application and starting it again, which is the cleanup of all of the components first and then instantiating them again. This action is equivalent to the SU restart recovery action performed simultaneously on all SUs of the application and coordinated across the cluster; i.e., Eq. (15) can be used to estimate the recovery time with the modifications that j iterates through the CompTypes of all SUTypes of the application.

Finally, the cluster reset recommended recovery means that AMF simultaneously reboots all the nodes in the cluster and restarts the applications on them. When restarting the cluster, AMF starts to assign the assignments when either all required components have instantiated successfully or when the saAmfClusterStartupTimeout expires. Accordingly, the recovery time can be estimated by Eq. (16):

$$MTTR = \max_{1 \leq j \leq N}(NodeRebootTime_j) + saAmfClusterStartupTimeout \quad (16)$$

The description above presents the service recovery time (i.e., MTTR) for the different actual recovery actions AMF may take after a component failure. Furthermore, every CompType has a failure rate (i.e., MTTF) provided as an input. Hence, by using the recovery time estimate and the failure rate of a CompType, the system (which performs the availability-estimate based method) estimates the availability of the CSTypes that the CompType may provide. The system further combines the availability of the CSTypes to estimate the availability of the SvcType. With this estimate it can be determined whether the type stack cannot provide the service with the availability requested and therefore does not need to be considered for configuration generation.

To calculate the availability of an SvcType provided by several CompTypes, the system multiplies the availability of the CompTypes participating in its provisioning. The reason for multiplying is because an SI of the SvcType is available only if all its CSIs (of the CSTypes) are provided by some components of the CompTypes and therefore available. Accordingly, Eq. (17) can be used to calculate the service availability for each SvcType:

$$STSA = \prod_{j=1}^{j \leq NP} \frac{MTTF_j}{MTTF_j + MTTR_j} \quad (17)$$

where MTTFj is the failure rate of CompType$_j$ that has been included in the type stack to provide some CSTypes of the SI's SvcType. MTTRj is the recovery time estimate for CompType$_j$ based on the applicable actual recovery action in case of the failure. NP is the number of CompTypes in the type stack that participate in providing the SvcType.

This calculation means that if two components derived from the same CompType are in an SU to provide an SI of the SvcType, their availability is less than if only one was required. Hence taking into account one component for each CompType (assumption (A1) mentioned above) provides an estimate for the maximum achievable availability for the CompType; therefore, it is safe to eliminate type stacks that cannot provide the requested availability by such an estimate.

Accordingly, the service availability is estimated for each SvcType (STSA) for each type stack, and the resulting STSA is compared with the requested service availability specified in the configuration requirements. If a type stack cannot provide at least the requested service availability for any of the SvcTypes, it is eliminated from the list of type stacks.

The above description explains estimating the service availability for the components which are independent, thus there is no dependency between the components (as mentioned above in assumption (A5)). The next step is to consider the dependencies among the components (prototypes) as well. In the following, the dependencies among CompTypes are discussed.

Instantiation-Level dependency: one of the complexities of estimating the service availability is the instantiation level dependency among the components of the same SU. According to this dependency, the instantiation of a component is a prerequisite for the instantiation of the other component. This type of dependency is applicable only when instantiating or terminating an SU. The following explains the instantiation-level dependency and the way it can be handled in the availability estimation. The instantiation level dependency considers the following factors:

Within an SU, AMF instantiates all components with the same instantiation level in parallel. Moreover, AMF instantiates the components of a given instantiation level, only when all components with a lower instantiation level have been instantiated successfully.

Within an SU, the AMF terminates all components with the same instantiation level in parallel. Furthermore, AMF only terminates the components of a given instantiation level only when all components with a higher instantiation level have been terminated.

As mentioned, the instantiation level dependency is only applicable during the instantiation and termination of an SU. Therefore, it is applicable for the SU restart recovery action.

According to the discussion above, if there is instantiation level dependency among the CompTypes of an SUType, the system uses Eq. (18) instead of Eq. (14) to calculate the recovery time of an SU restart recovery action. Let M be the highest level of the dependency among the CompTypes of the SUType, the SU restart recovery time can be calculated as follows:

$$MTTR = \Sigma_{i=1}^{M} Max_{1 \leq j \leq N}(CleaupTime_{ij}) + \Sigma_{i=1}^{M} Max_{1 \leq j \leq N}(PCS_{ij} \times AOT_{ij}) \quad (18)$$

where i varies from one to the M and j iterates through the number of CompTypes that have the same instantiation level in the SUType. For instance, the term $Max_{1 \leq j \leq N}(CleaupTime_{ij})$ in the equation above represent the maximum time that is needed to clean up the CompTypes of the $i^{th}$ instantiation level.

Proxy-Proxied dependency: according to this dependency, if the proxy component fails, the AMF finds another proxy component to take over the proxying work. In the meanwhile, the proxied component(s) can continue providing its services. Only if the proxy component and its proxied components fail at the same time, the proxied component cannot provide its service. No additional calculations are considered for this type of dependency, as the failure of the proxy component does not indicate the failure of the proxied component(s).

CSI-CSI dependency: due to the CSI-CSI dependency, the components will be assigned in a defined order. It was assumed that the CSI assignments were done in parallel. However, if there is a CSI-CSI dependency, the CSIs assignments are done sequentially. It means that first the sponsor CSI is assigned to the component, and then its dependent CSI(s). In such a case, the CSS of the CompType providing the dependent CSI is increased in a way that it includes the CSS of the CompType providing the sponsor CSI. The same logic applies for CSIs removal. It means that the sponsor CSI is removed from a component, only when its dependent CSI(s) is removed from the assigned component(s).

SI-SI dependency: an SI may be configured to depend on other SIs, in the sense that an SU can only be assigned as active for the dependent SI if all its sponsor SIs are assigned. The AMY defines the tolerance time as a configurable attribute of a dependency between SIs. For example, if the SI1 depends on the SI2, the tolerance time indicates for how long SI1 can tolerate SI2 being in the unassigned state. If this time passes before SI2 becomes assigned again, the AMF will remove the assignments of SI1 from the SU. Accordingly, the estimation calculations will be impacted in a way that, if the MTTR of the sponsor service is more than the tolerance time of the dependent service, the availability of the dependent service will be reduced by the availability of its sponsor. Thus, the availability estimation of the dependent service is reduced as calculated by Algorithm I.

---
Algorithm I. An algorithm to calculate the availability in case of SI-SI dependency
---
CalculateTheSAOfDependentServiceType ( )
Begin
   sponsorServiceMTTR = the MTTR that is calculated for the sponsor service
   if (sponsorServiceMTTR > tolerance time of the dependent service) then
      dependentServiceSA = the SA that is calculated for
      the dependent service
      sponsorServiceSA = the SA that is calculated for the sponsor service
      NewDependentServiceSA= dependentServiceSA * SponsorServiceSA
      dependentServiceSA = NewDependentServiceSA
   End if
End
---

Figure 10:
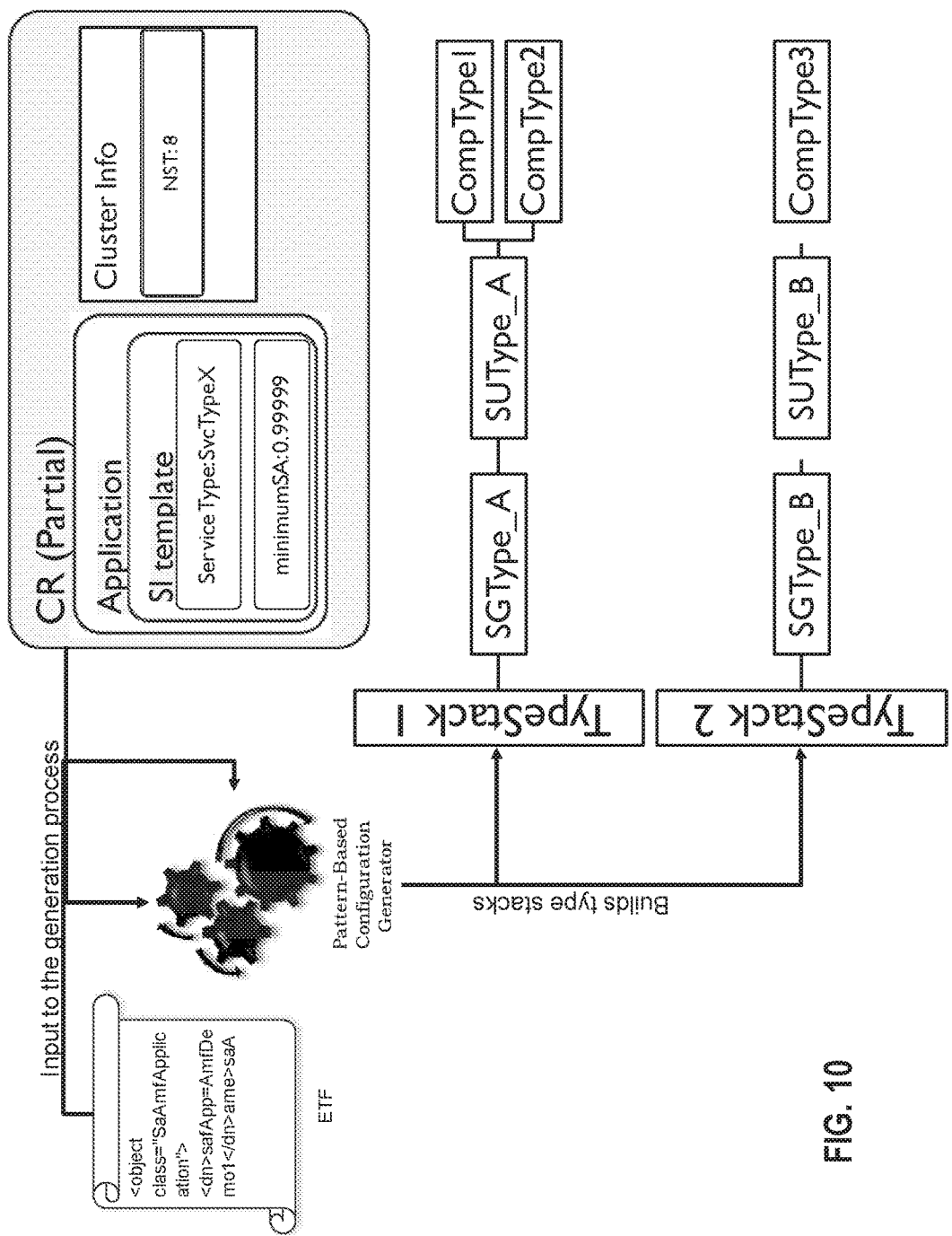
FIG. 10 illustrates an example of selecting a type stack based on estimated service availability according to one embodiment.

FIG. 10 illustrates an example of selecting a type stack based on estimated service availability, where the ETF prototypes selected to provide SvcTypeX are arranged into two type stacks. While TypeStack1 uses CompType1 and CompType2 together to deliver a service, TypeStack2 uses only CompType3 to provide the same service. The availability requested for the SI of SvcTypeX in the configuration requirements is 0.99999 (or 99.999%). Table III provides the attributes for the CompTypes in the type stacks which are used as input for the estimation calculations.

TABLE III

| Input attributes for the example | | | |
|---|---|---|---|
| Input attributes | CompType1 | CompType2 | CompType3 |
| CIT (Sec) | 3 | 4 | 3 |
| IT (Sec) | 1 | 2 | 2 |
| CSS | 3 | 1 | 2 |
| PCS | 0.7 | 0.8 | 0.9 |
| PCNS | 0.3 | 0.2 | 0.1 |
| PIS | 0.9 | 0.9 | 0.8 |
| PINS | 0.1 | 0.1 | 0.2 |
| PISD | 0.9 | 0.8 | 0.9 |
| PINSD | 0.1 | 0.2 | 0.1 |
| NIWOD | 2 | 2 | 2 |
| NIWD | 1 | 1 | 1 |
| N | 3 | 3 | 3 |
| D | 2 | 2 | 2 |
| Failure Rate (Sec) | 530000 | 920000 | 870000 |
| Actual Recovery Action | Component Restart | Component Failover | SU Failover |

Rather than presenting the attributes of the SGTypes and the SUTypes, the input to the system includes the results of the actual recovery analysis for each of the CompTypes. In one embodiment, the system starts with calculating the NCF according to Eq. (1), which is the time that the node takes to be shutdown (NST=8 is given as input also) added to the timeout to fail over the CSIs of the components of the node. With respect to the components on the node, only the CompTypes of each type stack are known. This means that the NCF for TypeStack1 is the maximum between the CSS of CompType1 and CompType2.

$$NCF = NST + \max_{1 \le j \le N}(CSS) = 8 + \max(3,1) = 11$$

For TypeStack2 there is only one CompType:

$$NCF = NST + \max_{1 \le j \le N}(CSS) = 8 + \max(2) = 10$$

The system continues with estimating the recovery time for each of the CompTypes. CompType1 has component restart as the actual recovery action therefore the recovery time is estimated using Eq. (2) to Eq. (5). Using Eq. (2) the average outage for the portion of component instantiation without delay is calculated as:

$$AOTIWOD = $$
$$\sum_{i=1}^{NIWOD} [(PCS^i \times PINS^{i-1} \times PIS) \times ((i \times (CIT + ITCSS)) + CSS)] +$$

$$\sum_{i=1}^{NIWOD} [(PCS^{i-1} \times PINS^{i-1} \times PCNS) \times$$

$$((i \times CIT) + ((i-1) \times IT) + NCF)] =$$

$$\sum_{i=1}^{2} [(0.7^i \times 0.1^{i-1} \times 0.9) \times ((i \times (3+1)) + 3)] +$$

$$\sum_{i=1}^{2} [(0.7^{i-1} \times 0.1^{i-1} \times 0.3) \times ((i \times 3) + ((i-1) \times 1) + 11)] = 9.473100$$

The system uses Eq. (3) to calculate the average outage due to the component instantiation attempts with delay:

$$AOTIWD = PINS^{NIWOD} \times$$

$$\left[ \sum_{i=NIWOD+1}^{n} \begin{bmatrix} (PCS^i \times PINSD^{(i-NIWOD-1)} \times PISD) \times \\ ((i \times (CIT + IT)) + ((i - NIWOD) \times d) + CSS) \end{bmatrix} + \right.$$

$$\left. \sum_{i=NIWOD+1}^{n} \begin{bmatrix} (PCS^{i-1} \times PINSD^{(i-NIWOD-1)} \times PCNS) \times \\ ((i \times CIT) + ((i-1) \times IT) + \\ ((i - NIWOD - 1) \times d) + NCF) \end{bmatrix} \right] =$$

-continued $$0.1^2 \times \left[ \sum_{i=2+1}^{3} \left[ \begin{array}{c} (0.7^i \times 0.1^{(i-2-1)} \times 0.9) \times \\ ((i \times (3+1)) + ((i-2) \times 2) + 3) \end{array} \right] + \right. \\ \left. \sum_{i=2+1}^{3} \left[ \begin{array}{c} (0.7^i \times 0.1^{(i-2-1)} \times 0.9) + \\ \left[ \begin{array}{c} (0.7^{i-1} \times 0.1^{(i-2-1)} \times 0.3) \times \\ ((i \times 3) + ((i-1) \times 1) + ((i-2-1) \times 2) + 11) \end{array} \right] \end{array} \right] \right] =$$

0.084819

To calculate the outage for the case when all instantiation attempts fail, the system uses Eq. (4):

$OIF=PCS^n \times PINS^{NIWOD} \times PINSD^{NIWD} \times [(n \times (CIT+IT))+(NIWD \times d)+NCF]=0.7^n \times 0.1^2 \times 0.1^1 \times [(3 \times (3+1))+(1 \times 2)+11]=0.008575$ Finally the total recovery time estimate for CompType1 with the component restart recovery action is calculated according to Eq. (5):

$MTTR=AOTIWOD+AOTIWD+OIF=6.9051+ 0.073059+0.005831=9.566494$

The actual recovery action of CompType2 is component failover. The system estimates its recovery time as follows. First, the system uses Eq. (7) to estimate the time needed to switch over the CSIs of other components (i.e., the component of the prototype CompType1) in the SU (prototype). The value of N is equal to 1, as it represents the number of non-faulty components in the SU:

$$SOT = 2 \times \max_{1 \leq j \leq N}(CSS_j) = 2 \times \max_{1 \leq j \leq 1}(3) = 6$$

Then, the system uses Eq. (8) to calculate the recovery time for CompType2 whose actual recovery action is component failover:

$MTTR=[PCS \times (CIT+\text{Max}(SOT,CSS))]+[PCNS \times (CIT+NCF)]=[0.8 \times (4+\text{Max}(6,2))]+[0.2 \times (4+11)]=11$ TypeStack2 has only one CompType, namely CompType3, whose actual recovery action is SU failover. The system uses Eq. (9) to calculate the cleanup time needed for our single component.

$\text{CleanupTime}=[PCS \times (CIT)]+[PCNS \times (CIT+NCF)]= [0.9 \times (3)]+[0.1 \times (3+10)]=5.7$ Afterward, the system uses Eq. (15) to estimate the recovery time, where N denotes the number of components in the SU.

$$MTTR = \max_{1 \leq j \leq N}(\text{CleanupTime}_j) + \max_{1 \leq j \leq N}(PCS_j \times CSS_j) = (5.7) + (0.9 \times 2) = 7.5$$

With the recovery time estimates, the system can calculate the service availability estimate for SvcType_X for each of the type stacks. Using the Eq. (17) for TypeStack1, the service availability is estimated as:

$$STSA = \sum_{j=1}^{j \leq NP} \frac{MTTF_j}{MTTF_j + MTTR_j} =$$

$$\sum_{j=1}^{j \leq 2} \frac{MTTF_j}{MTTF_j + MTTR_j} = \frac{530000}{530000 + 9.566494} \times \frac{920000}{920000 + 11} \cong$$

$$0.999982 \times 0.999988 \cong 0.999969$$

where NP denotes the number of CompTypes, and $MTTF_j$ and $MTTR_j$ refer to the failure rate and the recovery time estimate of each component. For TypeStack2 the estimate is:

$$STSA = \sum_{j=1}^{j \leq NP} \frac{MTTF_j}{MTTF_j + MTTR_j} =$$

$$\sum_{j=1}^{j \leq 1} \frac{MTTF_j}{MTTF_j + MTTR_j} = \frac{680000}{680000 + 7.5} \cong 0.9999914$$

In TypeStack1 the service availability is calculated as 0.999969, while for TypeStack2 it is 0.999991. Hence, in this example only TypeStack2 is considered further in the configuration generation process.

The following description explains an embodiment of the availability-estimate based method applied to the third step (block 140) of the configuration generation process 100 (FIG. 1), which is the AMF entities creation. The existing AMF configuration generation method expects as input the number of SUs, the number of SGs and their redundancy model. These parameters depend on the software available; that is, the ETF prototypes selected to provide the services, their composition and the required level of service availability. Rather than expecting these parameters as input, the method described herein generates a configuration for a type stack that is expected to satisfy the requested level of availability according to the availability estimates.

In one embodiment, a system performing the availability-estimate based entities creation method automatically calculates first the number of components in each SU with respect to the level of service availability requested for the SI-template. Once the SU is known, the system can calculate the number of SUs for the SG ensuring that the number of SUs does not exceed the cluster size (i.e., the number of nodes). This constraint is added to prevent hosting more than one SU of an SG on the same node. The redundancy model and the number of SUs determine the capacity of an SG; hence the system can calculate the number of SGs needed to protect the SIs of the SI-template. Each of these operations is described in more detail in the following description.

It is noted that AMF entities are created based on the AMF types created in the second step (block 130) of the configuration generation process 100 (FIG. 1). Therefore, unless otherwise noted, in the following description with respect to the availability-estimate based entities creation method, entity types such as component types (CTs), component service types (CSTs), service unit types (SU types) and service group types (SG types) refer to AMF types and are abbreviated herein in respective parentheses.

In one embodiment, the system calculates the number of components of a given CT in a SU with respect to the required service availability. The calculations for estimating the availability due to components failures have been covered in the previous paragraphs. There, an assumption (A1) was made that there is a single component of each required CT in each SU. In the following, the assumption (A1) is removed; it is determined how many components are needed to provide an SI and how many of them can be placed together in an SU while still meeting the availability requirements for the SIs.

The availability-estimate based entities creation method described herein ensures the number of created entities in the configuration meets the availability requirements. Two assumptions are made in the calculations: (1) only one CT in the SU type can provide a particular CST; and (2) the different service types can be provided by different sets of CTs. This can be true because the separation of CSTs design pattern is applied prior to this step.

More specifically, in the description of the availability-estimate based entities creation method, the following assumptions are made: Each type stack includes a CT for each component service type (CST) required by a service type (SvcType) of an SI-template (SIT) of the configuration requirements. A CT may be included to provide different CST, but for the same CST only a single CT is included. The SvcType of a SIT determines the CST to be provided by the CTs of a SU type.

The abbreviations of Table IV are used hereinafter.

TABLE IV

List of Acronyms for Availability Estimate-Based Entities Creation Method

| Abbreviation | Definition |
| --- | --- |
| SUMaxCapPerCT | Maximum number of components of a given CT that can be put in the SU |
| NoOfCompsPerCST | Number of components of a CT that can provide a particular CST |
| ActiveCapabilityPerCST | Component capability to handle active assignments (per CST) |
| StandbyCapabilityPerCST | Component capability to handle standby assignments (per CST) |
| NoOfSIs | Number of SIs of the SI Template |
| NoOfCSIsPerCST | Number of CSIs of a CST in each SI of the SI template |
| NoOfActiveAssignments | Number of active assignments per each SI |
| NoOfStandbyAssignments | Number of standby assignments per each SI |
| NoOfNodes | Number of nodes in the cluster |

In some embodiments, the number of components of a given CT in an SU is calculated with respect to the requested availability for the SIs. In the previous discussion, it was shown the availability estimation of a service (type) assuming that there is only one component of each CT. Hereby, it can be shown how far the number of components of each type (that is now AMF CT) can be increased, with respect to the required level of availability.

To estimate the availability of a service, the system multiplies the deliverable availability of the components that are participating to provide the service. Due to the multiplication of the components' deliverable availability, the larger the number of components, the lower the service availability. Therefore, to calculate the number of components in an SU, the system cannot increase the number of components to the point that the multiplication of the components' deliverable availability becomes lower than the requested service availability. For this goal, the system starts with putting a minimum number of components of each CT in the SU, and then increases the number of components to the point that the availability requirement is not violated.

The minimum number of components of a CT to be put in the SU depends on the capability of the CT. Algorithm II defines the steps to calculate the minimum number of components of each CT in the SU, taking into account that the SU is capable of providing a minimum of one SI.

Algorithm II. An algorithm to find the minimum number of components of a CT in an SU

```
CalculateMinimumNumberOfCompsPerCT (ServiceType svc)
Begin
    For each CT:ct that participates to provide the svc do
        MinimumNoOfCompsPerCT= 1
        For each CST in ct do
            tempNumberOfCompsPerCST= Max ( Cell (NoOfCSIsPerCST / ActiveCapabilityPerCST) and
                                           Ceil (NoOfCSIsPerCST / StandbyCapabilityPerCST) )
            if( tempNumberOfCompsPerCST > MinimumNoOfCompsPerCT) then
                MinimumNoOfCompsPerCT = tempNumberOfCompsPerCST
            End if
        End do // each CST
        ct.MinNumberOfComponents = MinimumNoOfCompsPerCT
    End do // each CT:ct
End
```

Similarly, the system calculates the maximum number of components of each CT to be put in an SU. Algorithm III defines the steps to calculate the maximum number of components of a CT, taking into account that SU is capable of providing at most all the SIs of the SI template (i.e. NoOfSIs). Algorithm III is used when the maximum number of components of a CT is not specified (i.e. unlimited) in the ETF.

Algorithm III. An algorithm to find the maximum number of components of a CT in an SU

```
CalculateMaximumNumberOfCompsPerCT (ServiceType svc)
Begin
    For each CT:ct that participates to provide the svc do
        MaximumNoOfCompsPerCT= 0
        For each CST in ct do
            If ( redundancy model is No Redundancy) then
                MaxSIsNo = 1      // an SU can provide at most one SI in no-redundancy model
            else
                MaxSIsNo = NoOfSIs in the SI template
            End if
            tempNumberOfCompsPerCST=Max(Ceil(MaxSIsNo*NoOfCSIsPerCST/ActiveCapabilityPerCST)
and Ceil (MaxSIsNo*NoOfCSIsPerCST/StandbyCapabilityPerCST) )
            if( tempNumberOfCompsPerCST > MaximumNoOfCompsPerCT) then
                MaximumNoOfCompsPerCT = tempNumberOfCompsPerCST
            End if
        End do // each CST
        ct.MaxNumberOfComponents = MaximumNoOfCompsPerCT
    End do // each CT:C
End
```

The actual number of components (of a CT) that is targeted is between the minimum and maximum number of components. The system uses Algorithm IV to calculate the actual number of components of the CTs in an SU, by taking into account the requested service availability.

Algorithm IV. An algorithm to find the number of components of a CT in an SU

```
FindNumberOfCompsPerCT ( )
Begin
    M = number of CTs
    // find the proportion that the components of each CT needs to be put together, and set the initial value
        of NumberOfCompsPerCT to the MinimumNoOfCompsPerCT
    NumberOfComponentsPerCT[1: M] = CalculateMinimumNumberOfCompsPerCT ( )
    i = 1
    do {
        NumberOfComponentsPerCT[1: M] = NumberOfComponentsPerCT[1: M] * i
        //number of components of a CT should not exceed the maximum number of components of the
        CT specified in ETF or by CalculateMaximumNumberOfCompsPerCT( )
        If ( the number of components for none of the CTs exceeds their upper bound) then
        {
            SA = Calculate the service availability by multiplying the availability of all of the components
            If ( SA is more than the requested SA) then
            {
                i++
                continue;
            }
            Else // roll back the i value to its previous value and return the number of components
            {
                i--
                NumberOfComponentsPerCT[1: M] = NumberOfComponentsPerCT[1: M] * i
                return NumberOfComponentsPerCT[1: M]
            }
            End if
        }
        Else // roll back the i value to its previous value and return the number of components
        {
            i--
            NumberOfComponentsPerCT[1: M] = NumberOfComponentsPerCT[1: M] * i
            return NumberOfComponentsPerCT [1: M]
        }
        End if
    } while ( SA >= CR.SA) // while calculated SA is higher than the availability requested in the CR
End
```

The logic behind the algorithm above is to start with putting the minimum number of components of each CT in the SU. This minimum number also represents the proportion of the number of components of the CTs in the SU. Therefore, the number of components of a CT is always a coefficient of its minimum number. Afterward, the system iteratively increases the number of components based on their proportion. For example, consider that the minimum and maximum number of components of the "CT1" are calculated as 4 and 16, respectively. In this case, the number of components of the "CT1" can be 4, 8, 12 or 16. In each iteration, the system increases the number of components based on their proportion, and then calculates the achievable service availability as Eq. (19):

$$SISA = \sum_{j=1}^{j \leq N} \frac{MTTF_j}{MTTF_j + MTTR_j} \quad (19)$$

where N is the total number of components (i.e., summation of the number of components of all the CTs) that are participating to provide the service. In each step, if the calculated service availability (SISA) satisfies the availability requirements, the system iterates again by increasing the number of components. This iteration is performed multiple times unless: (a) the SISA becomes lower than the requested service availability, or (b) or the number of components of any of the CTs exceeds the maximum number of components of the CT that is determined by Algorithm III. Note that the discussed calculation is to be applied to all of the service types that are being provided by the SG type, separately.

To conclude, the number of components of a CT in a SU is between the minimum and maximum number of components of the CT calculated by Algorithm II and Algorithm III, respectively. Moreover, the number of components of a CT in a SU is calculated as the minimum number of components of a CT multiplied by i, where i iterates through one to the number of SIs of the SI template (i.e., NoOfSIs).

the aforementioned levels (e.g. SU restart), the other components (in the same SU) that are providing Svc2 will be subject to restart, as well. Therefore, the Svc2 will have an outage as well as the Svc1. In such a case, the SISA calculation for Svc2 can be refined as Eq. (20):

$$SISA = \sum_{j=1}^{j \leq N+M} \frac{MTTF_j}{MTTF_j + MTTR_j} \quad (20)$$

where N is the total number of components that are participating to provide Svc2, and M is the number of components that are providing the Svc1 and have the actual recovery of the SU, node, application or cluster levels.

The number of SGs and SUs calculations that have been proposed are per CST. The calculations are applied per CST of the service type that the SG type protects, separately. Then, the one that resulted in a greater number of SGs can be chosen. Furthermore, if there are more than one CST by which the calculations result in the same number of SGs, the one that has the greater number of SUs can be selected. For example, if there is a service type that has three CSTs, the system will use the calculations below for the all the three CSTs, separately. Then, select the one that resulted in a greater number of SGs. Algorithm V defines the steps to calculate the number of SUs and SGs.

---

Algorithm V. An algorithm to find the number of SUs and SGs for an SG type

```
CalculateNumberOfSUsAndSGs ( )
Begin
    FindNumberOfCompsPerCT( ) // uses Algorithm IV to find the number of components of each CT in the SU
    NoOfSGs = 0
    NoOfSUs = 0
    For each CST:cst that is in the services (SI templates) that the SG type protects do
        NoOfCompsPerCST= find the CT that can provide the cst, and use the number of components of the
                        the CT, that has been calculated by FindNumberOfCompsPerCT( )
        tempNoOfSGs = for the cst, calculate the number of SGs by using Eq. (21) to Eq. (40)
        tempNoOfSUs = for the cst, calculate the number of SUs by using Eq. (21) to Eq. (40)
        If ( tempNoOfSGs > NoOfSGs ) then
        {
            NoOfSGs = tempNoOfSGs
            NoOfSUs = tempNoOfSUs
        }
        Else if ( tempNoOfSGs == NoOfSGs ) then
        {
            If ( tempNoOfSUs > NoOfSUs ) then
                NoOfSUs = tempNoOfUs
            End if
        }
        End if
    End do // each CST:cst
    Return NoOfSGs and NoOfSUs
End
```

---

The calculations start with i=1 and increment the value of i in each iteration, unless the calculated service availability does not satisfy the availability requirements.

In the above, it has been shown how to calculate the number of components in an SU. However, the service availability calculation (i.e., Eq. (19)) does not consider the impact of the recovery action of a service on another service. The following example helps in clarifying this. Assume that the SU1 is required to provide two services (i.e., SI templates) which are Svc1 and Svc2. In such a case, the recovery action of Svc1 can affect the availability of Svc2, if the recovery action (of Svc1) is at the SU, Node, Application or Cluster levels. It means that if a component that is providing Svc1 fails and it has the actual recovery action of As mentioned, the calculations of the number of SGs (of an SG type) and SUs mostly depend on the redundancy model of the SG type. In the following discussion, the calculations for each redundancy model will be explained separately. Again, it is noted that a constraint is imposed on the system that no more than one SU of an SG can reside on the same node. It means that the maximum number of SUs within an SG cannot exceed the number of nodes.

No-Redundancy redundancy model: In this redundancy model, each SU can be assigned as active for at most one SI. Therefore, to handle all the SIs, the number of SUs is equal to the number of SIs. The system can use an additional spare SU to take the SI assignment in case of an SU failure.

As mentioned earlier, the maximum number of SUs in an SG cannot exceed the number of nodes. It is known that the number of SUs is equal to number of SIs. Therefore, if the number of SIs exceeds the number of nodes, the system needs to distribute the SIs to more SGs. In one embodiment, the number of SGs is calculated as Eq. (21):

$$NumberOfSGs = Ceil\left(\frac{NoOfSIs}{NoOfNodes - 1}\right) \quad (21)$$

In the equation above, the system divides the total number of SIs to the number of nodes minus one. This is because it reserves one node to later put a spare SU on it. Once the system has calculated the number of SGs, it can calculate the number of SUs (including one spare SU) per each SG, as Eq. (22):

$$NumberOfSUsPerOneSG = Ceil\left(\frac{NoOfSIs}{NumberOfSGs}\right) + 1 \quad (22)$$

2N Redundancy model: In this redundancy model, there is at most one SU for all the SIs' active assignments and one SU to handle all the SIs' standby assignments. Hence, the number of SUs in each SG is equal to two. However, depending on other criteria such as the number of components in an SU, one SG might not be able to handle all the SIs of the SI template. Therefore, the system might need to add more SGs to be capable of handling all of the SIs. To find the number of SGs needed, at first, the system needs to find the maximum number of SIs that an active SU can handle as Eq. (23):

$$MaxNoOfSIsPerOneActSU = \quad (23)$$
$$floor\left(\frac{NoOfCompsPerCST \times ActiveCapabilityPerSCT}{NoOfCSIsPerCST}\right)$$

In the equation above, the system uses floor because the maximum number of SIs that can be assigned to an SU has to be an integer number. Once the maximum number of SIs that an active SU can handle is found, the system finds the maximum number of SIs that a standby SU is capable of handling, as Eq. (24).

$$MaxNoOfSIsPerOneStdSU = \quad (24)$$
$$floor\left(\frac{NoOfCompsPerCST \times StandbyCapabilityPerCST}{NoOfCSIsPerCST}\right)$$

The number of SIs that an SG can handle is the minimum of MaxNoOfSIsPerOneActSU and MaxNoOISIsPerOneStdSU. For example, assume that in a 2N redundancy model, the active SU can handle 5 SIs and the standby SU can handle 6 SIs. In such a case, the number of SIs that can be handled by the SG is equal to 5. Accordingly, the system calculates the number of SGs that are needed to handle all the SIs of the SI template, as Eq. (25):

$$NumberOfSGs = Ceil\left(\frac{NoOfSIs}{min(MaxNoOfSIsPerOneActSU, MaxNoOfSIsPerOneStdSU)}\right) \quad (25)$$

N+M Redundancy model: In this redundancy model, there are a total number of N active SUs and M standby SUs to handle the SIs protected by the SG (i.e., N+M SUs).

In order to find the total number of SUs in the N+M redundancy model, at first the system finds the maximum number of SIs that can be assigned to an active and standby SUs as Eq. (23) and Eq. (24), respectively. Once it has found the maximum number of SIs that an active SU can handle, it can calculate the total number of active SUs needed to handle all of the SIs as Eq. (26):

$$NumberOfActSUs = Ceil\left(\frac{NoOfSIs}{MaxNoOfSIsPerOneActSU}\right) \quad (26)$$

Note that Ceil (Ceiling) is used to divide one SI between more than one SU. Similarly, the number of standby SUs needed to handle all the SIs' standby assignments can be calculated as Eq. (27):

$$NumberOfStdSUs = Ceil\left(\frac{NoOfSIs}{MaxNoOfSIsPerOneStdSU}\right) \quad (027)$$

Based on the equations above, to handle all the SIs active and standby assignments, the system calculates the total number of SUs as NumberOfActSUs+NumberOfStdSUs.

As mentioned before, the system considers the maximum number of SUs in one SG, equal to the number of nodes. Thus, if the total number of SUs (i.e., NumberOfActSUs+ NumberOfStdSUs) exceeds the number of nodes, the system needs to distribute the SUs on a greater number of SGs. In order to distribute the SUs among SGs fairly, at first the system needs to find the proportion of active and standby SUs that are needed to be put together in an SG. For example, if the total number of active SUs is 100 and the total number of standby SUs is 50, the active proportion is 2 and the standby proportion is 1. This means that every two active SUs need one standby SU to be collocated with them in the SG. It can also be concluded that, the number of active and standby SUs in each SG, is a coefficient of their proportion. The system determines the active and standby proportions as Eq. (28) and Eq. (29), respectively.

$$ActProportion = \left(\frac{NumberOfActSUs}{min(NumberOfActSUs, NumberOfStdSUs)}\right) \quad (028)$$

$$StdProportion = \left(\frac{NumberOfStdSUs}{min(NumberOfActSUs, NumberOfStdSUs)}\right) \quad (29)$$

According to the above discussion, the number of SUs in an SG can be between the number of ActProportion+Std-Proportion, and the NoOfNodes. In Eq. (30), the system calculates the total number of active and standby SUs that can be put together to be compliant with the NoOfNodes. In this equation, the system increases the number of SUs based on the ActProportion and StdProportion, to the point that the system reaches to the NoOfNodes. For example, if the ActProportion=2, StdProportion=1 and the NoOfNodes=7, the system can have (2+1)+(2+1)≤7 SUs in each SG.

$$NumberOfSUsPerOneSG = \qquad (30)$$
$$\min\left\{Ceil\left(floor\left(\frac{NoOfNodes}{ActProportion + StdProportion}\right) \times (ActProportion + StdProportion)\right),\right.$$
$$\left.(NumberOfAcrSUs + NumberOfStdSUs)\right\}$$

Once it has calculated the number of SUs per each SG, it can calculate the needed number of SGs to group total number of SUs, as Eq. (31):

$$NumberOfSGs = Ceil\left(\frac{NumberOfActSUs + NumberofStdUs}{NumberOfSUsPerOneSG}\right) \qquad (31)$$

NWayActive Redundancy model: In this redundancy model, there are no standby assignments and SUs. Every SI can have one or more active assignments (i.e., NoOfActive-Assignments>=1). The NoOfActiveAssignments has to be given as an input (i.e., configuration requirement). In order to calculate the number of SUs and SGs in the NWay-Active redundancy model, at first, the system calculates the maximum number of SIs that can be assigned to an active SU, by using the Eq. (23). Knowing the maximum number of SIs per one active SU, it can calculate the maximum number of SIs that can be handled by x SUs, where x is the number of nodes (i.e., NoOfNodes). The calculation is shown in Eq. (32):

$$MaxNumberOfSIsPerSG(With NoOfNodes SUs) = \qquad (032)$$
$$\min\left(MaxNoOfSIsPerOneActSU \times floor\left(\frac{NoOfNodes}{NoOfActiveAssignments}\right), NoOf(SIs)\right)$$

In the above equation, the system divides the NoOfNodes by NoOfActiveAssignments. This is because it is reserving some nodes for the SIs' other assignments. This can be clarified with an example. Consider a case that each SU can handle 10 SIs (i.e., MaxNoOfSIsPerOneActSU=10). There are also 4 nodes (i.e., NoOfNodes=4). In addition, the number of active assignments per each SI is equal to two (i.e., NoOfActiveAssignments=2). It is known that the SIs' assignments cannot be assigned to the same SU. Therefore, each SI needs two SUs to handle its two active assignments. By dividing the NoOfNodes by NoOfActiveAssignments, half of the nodes are reserved for the SIs' second assignments. As a result, with 4 SUs on 4 nodes the system can handle 10×(4/2)=20 SIs.

Also, the equation above uses the minimum of the two terms of the equation. This is because the number of SIs protected by each SG cannot be greater than the total number of SIs in the SI template. For example, if each SG can handle 20 SIs and the total number of SI of the SI template is equal to 15 (i.e. NoOfSIs=15), their minimum is chosen which is 15.

Now that the system has calculated the maximum number of SIs that each SG can handle (i.e., MaxNumberOf-SIsPerSG), it can calculate the number of SGs that are needed to handle the total number of SIs, according to the Eq. (33). For instance, if an SG can handle 10 SIs (i.e., MaxNumberOfSIsPerSG=10), and there are 50 SIs in the SI template (i.e., NoOfSIs=50), it needs to create 50/10=5 SGs to handle all of the SIs.

$$NumberOfSGs = Ceil\left(\frac{NoOfSIs}{MaxNumberOfSIsPerSG}\right) \qquad (33)$$

Finally, the system calculates the number of SUs per each SG as Eq. (34).

$$NumberOfSUsPerOneSG = \qquad (34)$$
$$NoOfActiveAssignment \times Ceil\left(\frac{MaxNumberOfSIsPerSG}{MaxNoOfSIsPerOneActSu}\right)$$

NWay Redundancy model: In the NWay redundancy model, the calculations are more complex than the other redundancy models. Each SI can have only one active assignment to an SU and one or more standby assignments to other SUs (i.e., NoOfStandbyAssignments>=1). The NoOfStandbyAssignments has to be given as an input (i.e., configuration requirements). Moreover, an SU can be assigned as active for some SIs and in the meanwhile, it can be assigned as standby for the other SIs. Thus, there are no explicit active and standby SUs. However, in this part when referring to active and standby SUs, it is meant the SUs that are needed to handle the SI's active and standby assignments, respectively.

In order to calculate the number of SUs and SGs in the NWay redundancy model, the same calculations are used as presented for NWay-Active redundancy model. However, in the NWay-Active redundancy model, the calculations were shown only for active point of view. In the NWay redundancy model, the system uses the same calculations, but for both active and standby points of view. Then, the system chooses the result from one of them as the reference result of the calculations.

Active point of view. First, the system uses Eq. (21) to calculate the maximum number of SIs that can be handled by one SU. Second, the system calculates the maximum number of SIs that can be handled by an SG with the maximum number of NoOfNodes-NoOfStandbyAssignments active SUs, as Eq. (35):

$$MaxNumberOfSIsPerActiveSG = \min(MaxNoOfSIsPerOneActSU \times \qquad (35)$$
$$floor(NoOfNodes - NoOfStandbyAssignments), NoOfSIs)$$

In the equation above, it has considered that the maximum number of active SUs in each SG is equal to the NoOf-Nodes-NoOfStandbyAssignments. This is because the NoOfStandbyAssignments is to survive from the simultaneous failures. Therefore, the system has to reserve NoOf-StandbyAssignments nodes (or SUs) in addition to the active SUs, in order to handle the NoOfStandbyAssignments simultaneous failures.

Then, by using the maximum number of SIs that each SG can handle, the system calculates the number of SGs that are needed to handle the total number of SIs, as Eq. (36):

$$NumberOfActiveSGs = Ceil\left(\frac{NoOfSIs}{MaxNumberOfSIsPerActiveSG}\right) \qquad (36)$$

Lastly, the system uses Eq. (37) to calculate the number of active SUs:

$$NumberOfActiveSUsPerOneSG = \qquad (037)$$
$$Ceil\left(\frac{MaxNumberOfSIsPerActiveSG}{MaxNoOfSIsPerOneActSU}\right) + NoOfStandbyAssignments$$

In the equation above, it can be seen that the system has added those SUs that are reserved for handling simultaneous failures (i.e., NoOfStandbyAssignments SUs).

Standby point of view. First, the system uses Eq. (24) to find the maximum number of SIs that a standby SU can handle. Then, the maximum number of SIs per one SG is calculated as Eq. (38). By using the equation, it is assuming that the SG can have a maximum of NoOfNodes−1 SUs. The maximum number of SUs is set as NoOfNodes−1, because one additional active SU is reserved to handle the only active assignment of the SIs. In other words, this is because no active and standby assignments of an SI can be assigned to the same SU.

$$MaxNumberOfSIsPerStandbySG = \qquad (38)$$
$$\min\left(MaxNoOfSIsPerOneStdSU \times \text{floor}\left(\frac{NoOfNodes-1}{NoOfStandbyAssignment}\right), NoOfSIs\right)$$

At this point, the system calculates the number of SGs that are needed to handle the total number of standby assignments of the SIs, as Eq. (39):

$$NumberOfStandbySGs = Ceil\left(\frac{NoOfSIs}{MaxNumberOfSIsPerStandbySG}\right) \qquad (39)$$

Finally, the system calculates the number of SUs in each SG as Eq. (40):

$$NumberOfStandbySUsPerOneSG = \qquad (40)$$
$$Ceil\left(\frac{MaxNumberOfSIsPerStandbySG}{MaxNoOfSIsPerOneStandbySU}\right) + 1$$

Once the system has calculated the number of SUs and SGs for both active and standby points of view, it can choose the reference result from the one that resulted in a greater number of SGs. If both points of view resulted in the same number of SGs, it can choose the one that resulted in a greater number of SUs.

FIG. 11 illustrates example configuration requirements for the availability estimate-based entities creation method according to one embodiment. In this example, the system calculates the number of AMF entities based on the partial configuration requirement information that is illustrated in FIG. 11. As it can be seen in the figure, there is an SI template with 12 SIs defined in the CR. Each SI consists of the CSIs of the two CSI templates. Moreover, each SI should have five CSIs of the FTP CST and five CSIs of the HTTP CST. The minimum level of service availability for the SI template is defined as 0.999. Also, the number of nodes in the cluster is set to five nodes.

Based on the configuration requirements, the system selects the ETF prototypes that can provide the requested service. Then, it derives the corresponding AMF types base on the selected prototypes. Once it has derived the AMF types, it applies the availability estimate-based entities creation method to calculate the number of entities of each AMF type. FIG. 12 illustrates the derived AMF types that are used in this example.

Number of Components calculation. First, Algorithm II is used to calculate the minimum number of components of each CT (i.e., FTP_CT and HTTP_CT) to be placed in an SU. Then Algorithm III is used to calculate the maximum number of components of each CT that can be put in an SU. The results given by using the algorithms is as follows:

For FTP_CT: minimum number of components=1 and maximum number of components=12.

For HTTP_CT: minimum number of components=2 and maximum number of components=24

Finally, Algorithm IV is used to calculate the number of components to be put together in the SU, with respect to the requested level of service availability requested (i.e., 0.999). Thus, the system starts with putting the minimum number of components of each CT in the SU. It means to start with 1 component of FTP_CT and 2 components of HTTP_CT. Then, the system calculates the service availability by using Eq. (19):

$$SISA = $$
$$\prod_{j=1}^{j \leq N} \frac{MTTF_j}{MTTF_j + MTTR_j} = \frac{53000}{53000+8.2} \times \left(\frac{67000}{67000+6.65}\right)^2 = 0.999646$$

Once the achievable service availability based on the number of components is calculated, the system checks if the availability requirements can be satisfied. As it can be seen, SISA=0.999646 can meet the requested availability (i.e., 0.999). Thus, this step is repeated by increasing the number of components of each CT. In this iteration, the number of components of each CT is increased based on their proportions. Hence, the number of components of the FTP_CT and HTTP_CT is 2 and 4, respectively. Once more, the system calculates the service availability by using Eq. (19):

$$SISA = $$
$$\prod_{j=1}^{j \leq N} \frac{MTTF_j}{MTTF_j + MTTR_j} = \left(\frac{53000}{53000+8.2}\right)^2 \times \left(\frac{67000}{67000+6.65}\right)^4 = 0.999293$$

The result of the SISA shows that the estimated service availability can satisfy the availability requirements. Thus, the system iterates the steps again, this time with 3 components of FTP_CT and 6 components of HTTP_CT. The equation below shows that in this iteration SISA=0.998940 becomes lower than the service availability requested in the CR.

$$SISA = $$
$$\prod_{j=1}^{j \leq N} \frac{MTTF_j}{MTTF_j + MTTR_j} = \left(\frac{53000}{53000+8.2}\right)^3 \times \left(\frac{67000}{67000+6.65}\right)^6 = 0.998940$$

Figure 13:
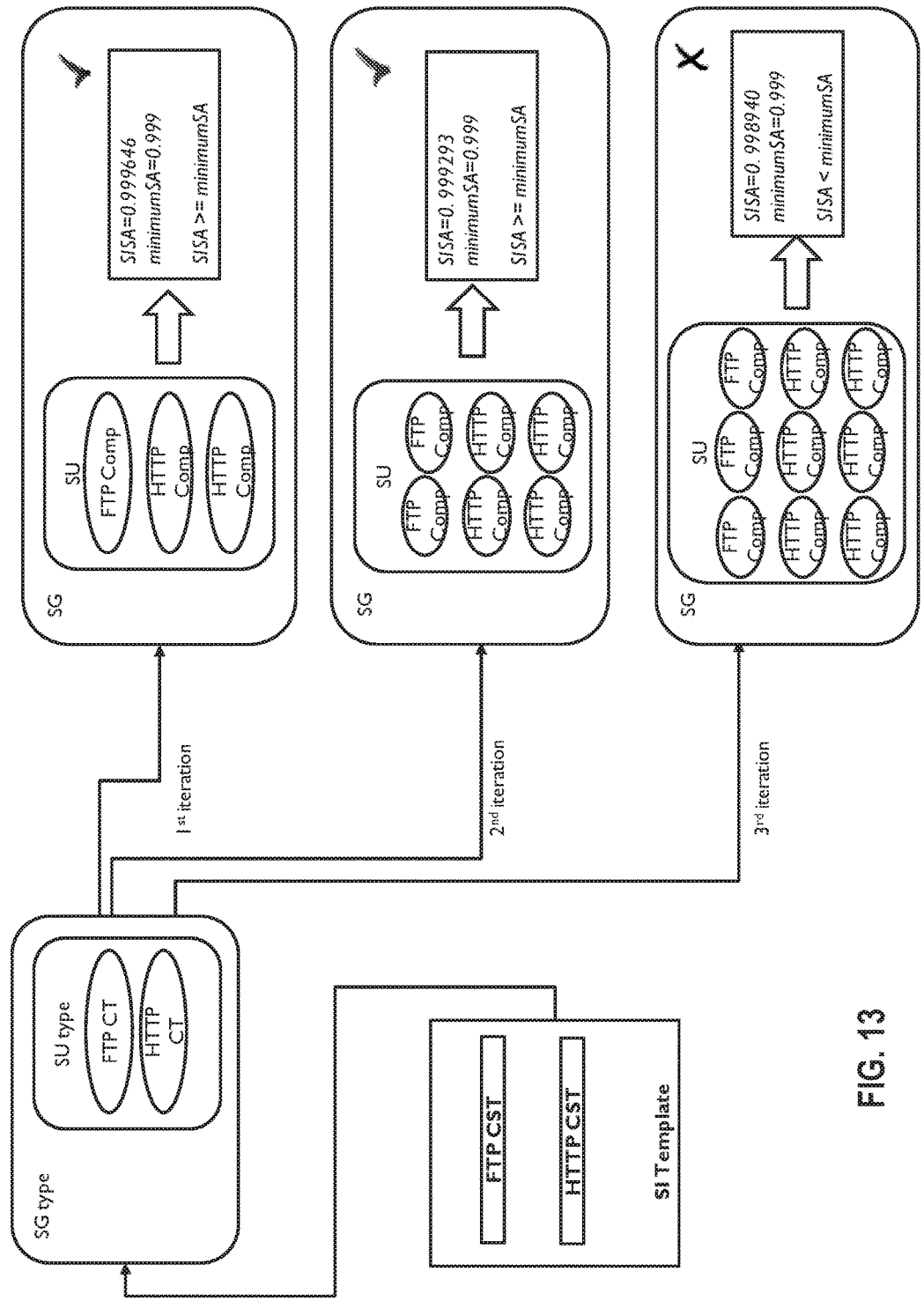
FIG. 13 illustrates an example of calculating the number of components to be used for an HA service.

At this stage, it can be concluded that these numbers of components per CT cannot satisfy the requested service availability. Therefore, the system sets the number of components of the CTs according to the previous iteration. It means that the number of components of the FTP_CT and HTTP_CT in the SU should be equal to 2 and 4, respectively. The steps that have been discussed above are depicted in the example of FIG. 13.

Number of SUs and SGs calculation: Once the number of components of each CT in an SU is calculated, the system calculates the number of SUs and SGs. The following is the summarized list of attributes and their value for this example (according to FIG. 11 and FIG. 12):

```
NoOfSIs = 12
Redundancy model of the SGs that that are going to protect the SI
template: N+M
For FTP_CST:
    NoOfCompsPerCST = 2, is the number components of the
    FTP_CT, which
    has been calculated above.
    ActiveCapabilityPerCST = 5
    StandbyCapabilityPerCST = 5
    NoOfCSIsPerCST = 5
For HTTP_CST:
    NoOfCompsPerCST = 4, is the number components of the
    HTTP_CT, which
    has been calculated above.
    ActiveCapabilityPerCST = 3
    StandbyCapabilityPerCST = 3
    NoOfCSIsPerCST = 5
```

As mentioned, the number of SUs and SGs is calculated per each CST. Thus, the calculations for FTP_CST and HTTP_CST will be presented separately. Then, one of them is selected as the reference result.

Number of SGs and SUs calculations for FTP_CST: To calculate the number of SUs and SGs for the N+M redundancy model, at first the system calculates the maximum number of SIs that can be assigned to an active SU as Eq. (23):

$$MaxNoOfSIsPerOneActSU = \operatorname{floor}\left(\frac{NoOfCompsPerCST \times ActiveCapabilityPerCST}{NoOfCSIsPerCST}\right) = \operatorname{floor}\left(\frac{2 \times 5}{5}\right) = 2$$

Then, the system calculates the maximum number of SIs that can be assigned to a standby SU as and Eq. (24):

$$MaxNoOfSIsPerOneStdSU = \operatorname{floor}\left(\frac{NoOfCompsPerCST \times StandbyCapabilityPerCST}{NoOfCSIsPerCST}\right) = \operatorname{floor}\left(\frac{2 \times 5}{5}\right) = 2$$

Then, the system calculates the total number of active SUs that are needed to handle all of the SIs (12 SIs) by using Eq. (26):

$$NumberOfActSUs = \operatorname{Ceil}\left(\frac{NoOfSIs}{MaxNoOfSIsPerOneActSU}\right) = \operatorname{Ceil}\left(\frac{12}{2}\right) = 6$$

Similarly, the system calculates the number of standby SUs needed to handle the standby assignments of all the SIs (12 SIs), by using Eq. (027):

$$NumberOfStdSUs = \operatorname{Ceil}\left(\frac{NoOfSIs}{MaxNoOfSIsPerOneStdSU}\right) = \operatorname{Ceil}\left(\frac{12}{2}\right) = 6$$

Based on the calculations above, it can be concluded that the total number of 6 active and 6 standby SUs are needed to handle all the SIs. As a result, 6+6=12 SUs are needed to handle all the SIs. However, the system needs to distribute the active and standby SUs in a way that the total number of SUs in an SG does not exceed the number of nodes of the cluster (i.e., 5 nodes). To do so, Eq. (028) and Eq. (29) are used to find the minimum proportion of active and standby SUs that are needed to be put together in an SG.

$$ActProportion = \left(\frac{NumberofActSUs}{\min(NumberOfActSUs, NumberOfstdSUs)}\right) = \left(\frac{6}{\min(6, 6)}\right) = 1$$

$$StdProportion = \left(\frac{NumberofStdSUs}{\min(NumberOfActSUs, NumberOfstdSUs)}\right) = \left(\frac{6}{\min(6, 6)}\right) = 1$$

The above equations show that each one active SU needs one standby SU to be placed with it in the SG. Then, the system uses Eq. (30) to calculate the total number of active and standby SUs that can be put together in each SG, with respect to the number of nodes.

$$NumberOfSUsPerOneSG = \min\left\{\operatorname{Ceil}\left(\operatorname{floor}\left(\frac{NoOfNodes}{ActProportion + StdProportion}\right)\right) \times (ActProportion + StdProportion)\right), (NumberOfActSUs + NumberOfStdSUs)\right\} =$$

$$\min\left\{\operatorname{Ceil}\left(\operatorname{floor}\left(\frac{5}{1+1}\right) \times (1+1)\right), (6+6)\right\} = 4$$

Once the number SUs per each SG is calculated, the system uses Eq. (31) to calculate the needed number of SGs:

$$NumberOfSGs = \operatorname{Ceil}\left(\frac{NumberOfActSUs + NumberOfStdSUs}{NumberOfSUsPerOneSG}\right) = \operatorname{Ceil}\left(\frac{6+6}{4}\right) = 3$$

According to the calculations above, the system needs 3 SGs, and each of them should group 4 SUs. The calculations above were only for FTP_CST. Next, the same calculations are done for the HTTP_CST.

Number of SGs and SUs calculations for HTTP_CST: First, the system calculates the maximum number of SIs that can be assigned to an active SU:

$$MaxNoOfSIsPerOneActSU =$$

$$\text{floor}\left(\frac{NoOfCompsPerCST \times ActiveCapabilityPerCST}{NoOfCSIsPerCST}\right) = \text{floor}\left(\frac{4 \times 3}{5}\right) = 2$$

Then, the system calculates the maximum number of SIs that can be assigned to a standby SU:

$$MaxNoOfSIsPerOneStdSU =$$

$$\text{floor}\left(\frac{NoOfCompsPerCST \times StandbyCapabilityPerCST}{NoOfCSIsPerCST}\right) =$$

$$\text{floor}\left(\frac{4 \times 3}{5}\right) = 2$$

Afterward, the total number of active SUs needed to handle all of the SIs can be calculated as:

$$NumberOfActSUs = \text{Ceil}\left(\frac{NoOfSIs}{MaxNoOfSIsPerOneActSU}\right) = \text{Ceil}\left(\frac{12}{2}\right) = 6$$

Similarly, the system calculates the number of standby SUs needed to handle the standby assignments of all the SIs:

$$NumberOfStdSUs = \tag{39}$$

$$\text{Ceil}\left(\frac{NoOfSIs}{MaxNoOfSIsPerOneStdSU}\right) = \text{Ceil}\left(\frac{12}{2}\right) = 6$$

Then, the system finds the minimum proportion of active and standby SUs that are needed to be put together:

$$ActProportion =$$

$$\left(\frac{NumberofActSUs}{\min(NumberOfActSUs, NumberOfstdSUs)}\right) = \left(\frac{6}{\min(6,6)}\right) = 1$$

$$StdProportion =$$

$$\left(\frac{NumberofStdSUs}{\min(NumberOfActSUs, NumberOfstdSUs)}\right) = \left(\frac{6}{\min(6,6)}\right) = 1$$

Once the system has calculated the ActProportion and StdProportion of the SUs in each SG, the system calculates the total number of active and standby SUs to be put together in each SG, with respect to the number of nodes.

$$NumberOfSUsPerOneSG =$$

$$\min\left\{\text{Ceil}\left(\text{floor}\left(\frac{NoOfNodes}{ActProportion + StdProportion}\right) \times \right.\right.$$

$$(ActProportion + StdProportion)\bigg),$$

$$(NumberOfActSUs + NumberOfStdSUs)\bigg\} =$$

$$\min\left\{\text{Ceil}\left(\text{floor}\left(\frac{5}{1+1}\right) \times (1+1)\right), (6+6)\right\} = 4$$

Once it has have calculated the number SUs per each SG, the system calculates the needed number of SGs by using Eq. (31):

$$NumberOfSGs =$$

$$\text{Ceil}\left(\frac{NumberOfActSUs + NumberOfStdSUs}{NumberOfSUsPerOneSG}\right) = \text{Ceil}\left(\frac{6+6}{4}\right) = 3$$

According to the calculations above, 3 SGs are to be created, with 4 SUs in each of the SG.

At this point, the system compares the results of the calculations for the CSTs and choose the one that resulted in a greater number of SGs. The following is a summarized result of the calculations for each CST: For FTP_CST: NumberOfSUsPerOneSG=4, NumberOfSGs=3. For HTTP_CST: NumberOfSUsPerOneSG=4, NumberOfSGs=3.

Figure 14:
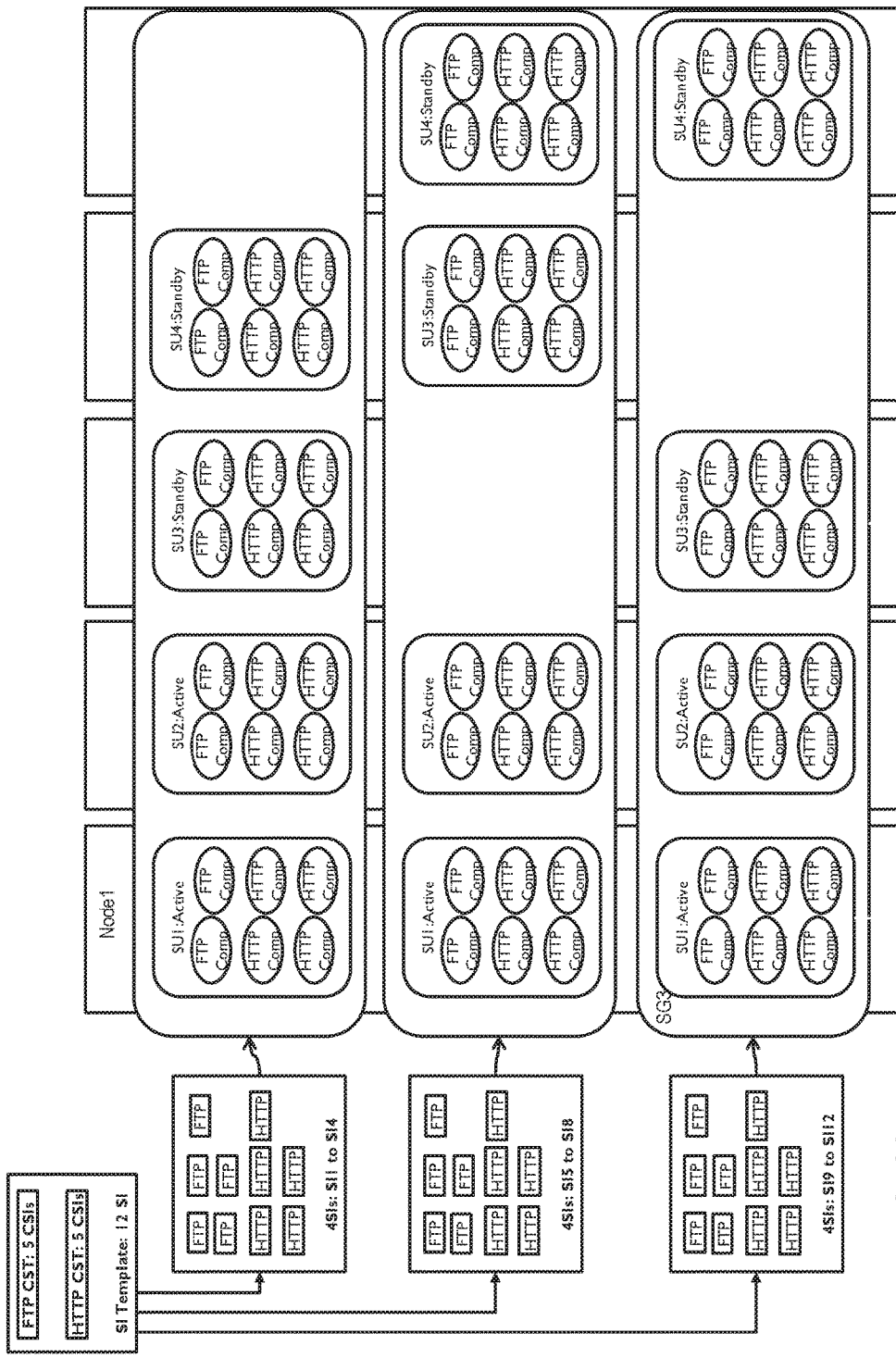
FIG. 14 illustrates an example of created entities using an embodiment of an availability-estimate based entities creation method.

As can be seen, the calculations resulted to the same number of SGs and SUs. Therefore, any of them can be chosen as the reference result of number of SGs and SUs. FIG. 14 illustrates the created entities in the example discussed above. It is noted that the distribution of SUs on the nodes and SIs assignments are performed by AMF at runtime. Therefore, FIG. 14 shows only one of the possible entity distributions.

Embodiments of the invention may be represented as a software product stored in a machine-readable medium (also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

Figure 15A:
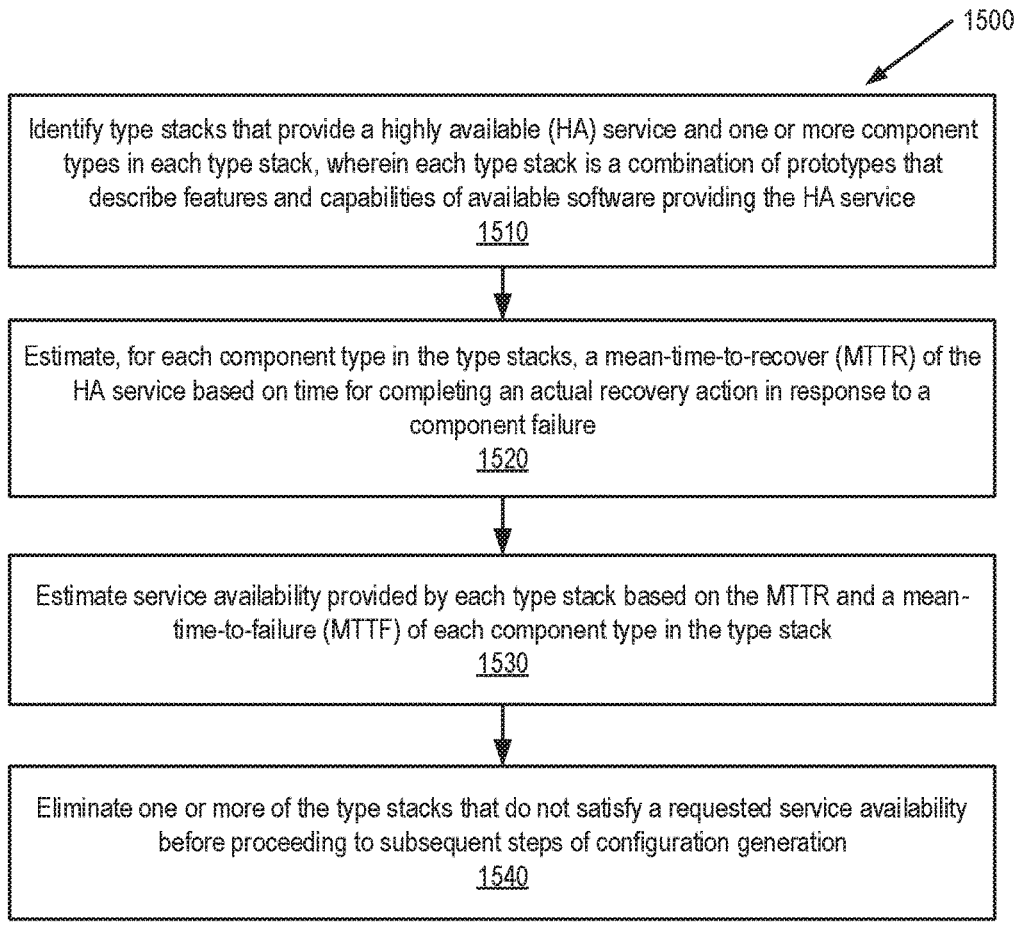
FIG. 15A is a flow diagram illustrating a method for eliminating type stacks in the process of generating a configuration for a service provider system according to one embodiment.

FIG. 15A is a flow diagram illustrating a method 1500 for eliminating type stacks in the process of generating a configuration for a service provider system to provide an HA service according to one embodiment. In one embodiment, the method 1500 begins with identifying type stacks that provide the HA service and one or more component types in each type stack, wherein each type stack is a combination of prototypes that describe features and capabilities of available software providing the HA service (block 1510). The method 1500 further comprises estimating, for each component type in the type stacks, an MTTR of the HA service based on time for completing an actual recovery action in response to a component failure (block 1520); estimating service availability provided by each type stack based on the MTTR and an MTTF of each component type in the type stack (block 1530); and eliminating one or more of the type stacks that do not satisfy a requested service availability before proceeding to subsequent steps of configuration generation (block 1540).

Figure 15B:
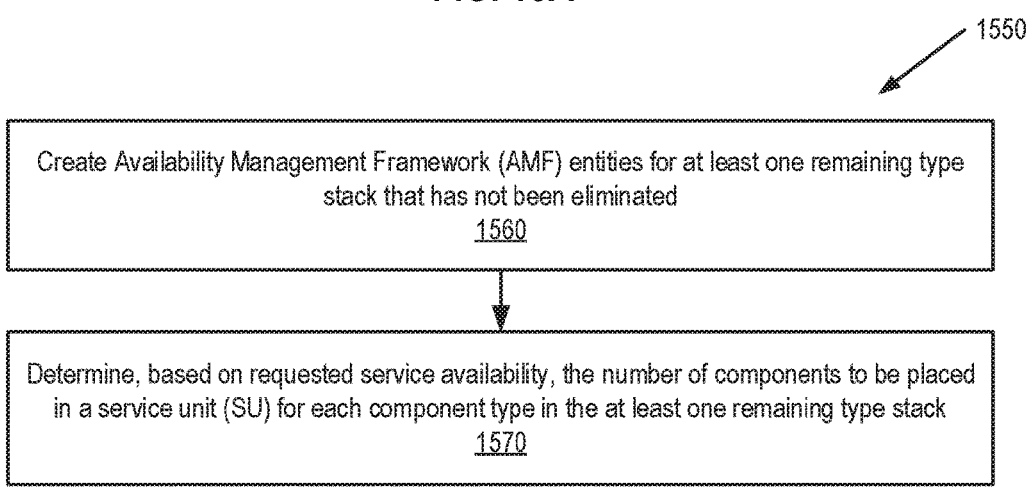
FIG. 15B is a flow diagram illustrating a method for creating AMF entities according to one embodiment.

FIG. 15B is a flow diagram illustrating a method 1550 for creating AMF entities in a configuration generation process for a service provider system to provide an HA service according to one embodiment. In one embodiment, the method 1550 begins after elimination of one or more type stacks according to the method 1500 of FIG. 15A. In one embodiment, the method 1550 comprises creating AMF entities for at least one remaining type stack that has not been eliminated (block 1560). The step of creating the AMF entities further comprises determining, based on the requested service availability, the number of components to be placed in an SU for each component type in the at least one remaining type stack (block 1570).

In one embodiment, the service provider system may provide a network service, such as a virtualized network function or a chain of virtualized network functions. In alternative embodiments the service provider system may be any mission critical system where service outage time needs to be minimized. The methods 1500 and 1550 of FIG. 15A and FIG. 15B may be performed by hardware (e.g., circuitry, dedicated logic, programmable logic, microcode, etc.), software (e.g., instructions run on a processing device), or a combination thereof. In one embodiment, the methods of FIG. 15A and FIG. 15B may be performed by a system 1600 of FIG. 16 and/or by a system 1700 of FIG. 17.

Figure 16:
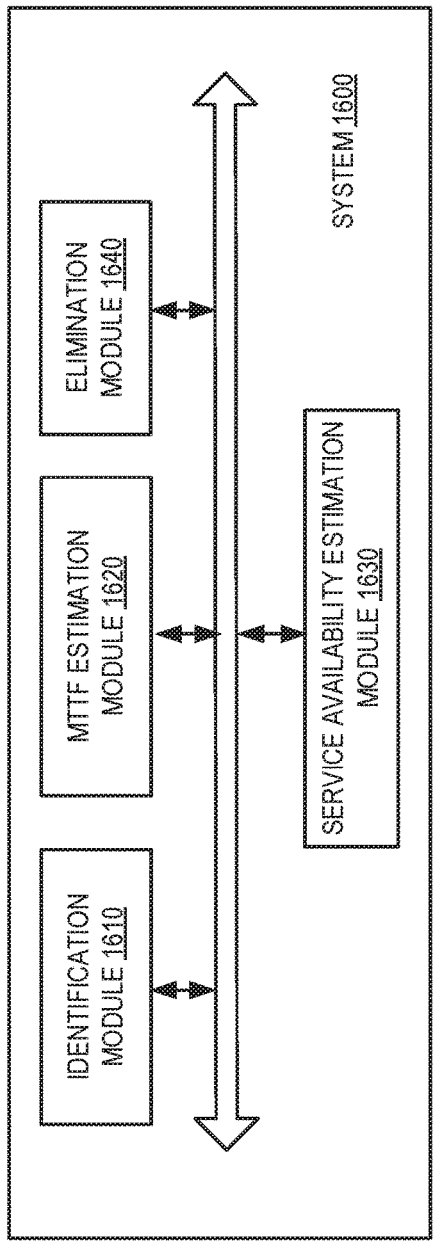
FIG. 16 illustrates a block diagram of a system for generating a configuration for a service provider system according to one embodiment.

FIG. 16 illustrates a system 1600 for generating a configuration for a service provider system for providing an HA service according to one embodiment. In one embodiment, the system 1600 performs the methods of FIG. 15A and FIG. 15B.

The system 1600 comprises an identification module 1610 adapted or operative to identify type stacks that provide the HA service and one or more component types in each type stack, wherein each type stack is a combination of prototypes that describe features and capabilities of available software providing the HA service; an MTTR estimation module 1620 adapted or operative to estimate, for each component type in the type stacks, an MTTR of the HA service based on time for completing an actual recovery action in response to a component failure; a service availability estimation module 1630 adapted or operative to estimate service availability provided by each type stack based on the MTTR and an MTTF of each component type in the type stack; and an elimination module 1640 adapted or operative to eliminate one or more of the type stacks that do not satisfy a requested service availability before proceeding to subsequent steps of configuration generation.

Figure 17:
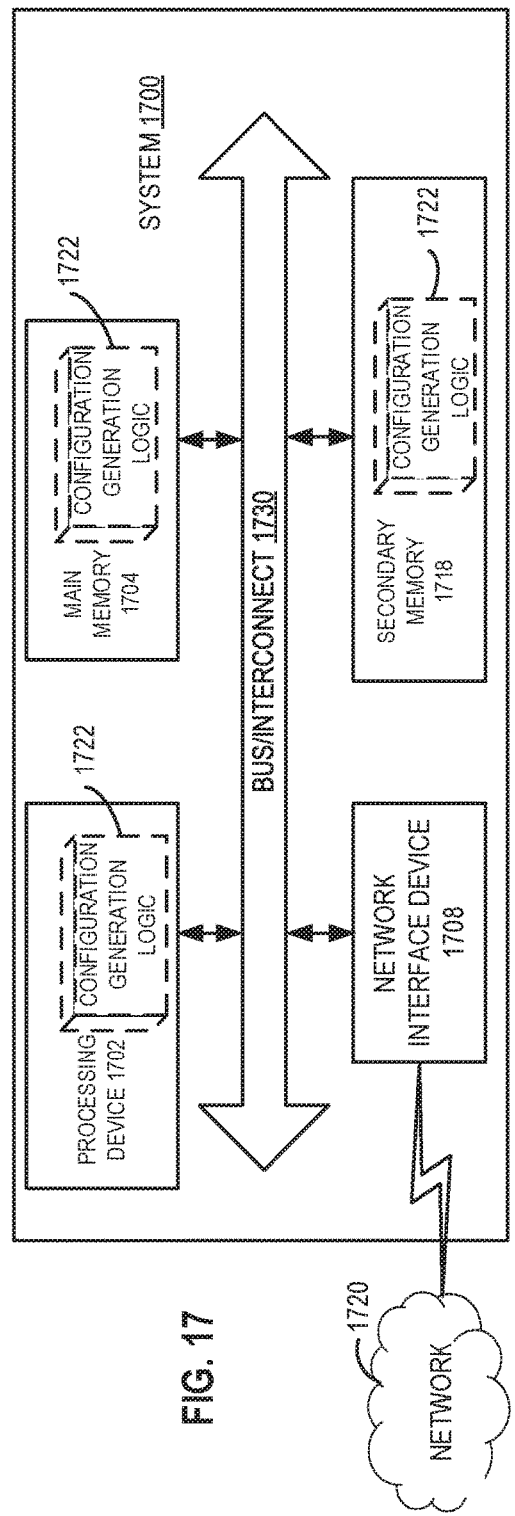
FIG. 17 illustrates a block diagram of a system for generating a configuration for a service provider system according to another embodiment.

FIG. 17 illustrates a diagrammatic representation of a machine in the exemplary form of a system 1700 within which a set of instructions, for causing the machine to perform any one or more of the methodologies discussed herein, may be executed. In one embodiment, the system 1700 may be part of a network node (e.g., a router, switch, bridge, controller, base station, etc.). In one embodiment, the system 1700 may operate in a cloud computing environment where multiple server computers in one or more service centers collectively provide computing services on demand. The computer system 1700 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The system 1700 includes a processing device 1702. The processing device 1702 represents one or more general-purpose processors, each of which can be: a microprocessor, a central processing unit (CPU), a multicore system, or the like. The processing device 1702 may also be one or more special-purpose processing devices such as an application specific integrated circuit (ASIC), a field programmable gate array (FPGA), a digital signal processor (DSP), network processor, or the like. In one embodiment, the processing device 1702 is adapted or operative to perform the methods of FIG. 15A and FIG. 15B. In one embodiment, the processing device 1702 is adapted or operative to execute the operations of a configuration generation logic 1722, which contains instructions executable by the processing device 1702 to perform the methods of FIG. 15A and FIG. 15B.

In one embodiment, the processor device 1702 is coupled to one or more memory devices such as: a main memory 1704 (e.g., read-only memory (ROM), flash memory, dynamic random access memory (DRAM), etc.), a secondary memory 1718 (e.g., a magnetic data storage device, an optical magnetic data storage device, etc.), and other forms of computer-readable media, which communicate with each other via a bus or interconnect 1730. The memory devices may also include different forms of read-only memories (ROMs), different forms of random access memories (RAMs), static random access memory (SRAM), or any type of media suitable for storing electronic instructions. In one embodiment, the memory devices may store the code and data of the configuration generation logic 1722. In the embodiment of FIG. 17, the configuration generation logic 1722 may be located in one or more of the locations shown as dotted boxes and labeled by the reference numeral 1722. In alternative embodiments the configuration generation logic 1722 may be located in other location(s) not shown in FIG. 17.

The system 1700 may further include a network interface device 1708. A part or all of the data and code of the configuration generation logic 1722 may be transmitted or received over a network 1720 via the network interface device 1708.

In one embodiment, the configuration generation logic 1722 can be implemented using code and data stored and executed on one or more computer systems (e.g., the system 1700). Such computer systems store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory) and transitory computer-readable transmission media (e.g., electrical, optical, acoustical or other form of propagated signals—such as carrier waves, infrared signals). A non-transitory computer-readable medium of a given computer system typically stores instructions for execution on one or more processors of that computer system.

The operations of the flow diagrams of FIGS. 15A and 15B have been described with reference to the exemplary embodiments of FIGS. 16 and 17. However, it should be understood that the operations of the flow diagrams of FIGS. 15A and 15B can be performed by embodiments of the invention other than those discussed with reference to FIGS. 16 and 17, and the embodiments discussed with reference to FIGS. 16 and 17 can perform operations different than those discussed with reference to the flow diagram. While the flow diagrams of FIGS. 15A and 15B shows a particular order of operations performed by certain embodiments of the invention, it should be understood that such order is exemplary (e.g., alternative embodiments may perform the operations in a different order, combine certain operations, overlap certain operations, etc.).

It is to be understood that the above description is intended to be illustrative, and not restrictive. Many other embodiments will be apparent to those of skill in the art upon reading and understanding the above description. Accordingly, the specification and drawings are to be regarded in an illustrative sense rather than a restrictive sense.

What is claimed is:

1. A computer-implemented method for generating a configuration for a service provider system to provide a highly available (HA) service, the method comprising:
    identifying type stacks that provide the HA service and one or more component types in each type stack, wherein each type stack is a combination of prototypes that describe features and capabilities of available software providing the HA service;
    estimating, for each component type in the type stacks, a mean-time-to-recover (MTTR) of the HA service based on time for completing recovery action in response to a component failure;
    estimating service availability provided by each type stack based on the MTTR and a mean-time-to-failure (MTTF) of each component type in the type stack; and
    eliminating one or more of the type stacks that do not satisfy a requested service availability before proceeding to subsequent steps of configuration generation.

2. The method of claim 1, wherein estimating the service availability further comprises counting a single component for each component type in the type stacks when estimating the service availability and wherein the MTTR is estimated at one or more levels that include a component level, a service unit (SU) level, a node level, and an application level.

3. The method of claim 1, wherein, when the recovery action includes a component restart recovery action, the method further comprises:
    estimating the MTTR of a component type as a sum of a first average outage time due to component instantiation attempts without delay, a second average outage time due to component instantiation attempts with delay, and a third average outage time due to failure of all of component instantiation attempts.

4. The method of claim 1, wherein, when the recovery action includes a component failover recovery action, the method further comprises:
    estimating the MTTR of a component type as a sum of a first element for which a component clean-up is successful and a second element for which the component clean-up is not successful.

5. The method of claim 1, wherein estimating the service availability further comprises:
    identifying dependency at one or more levels within the HA service;
    adjusting estimation of the service availability to account for the dependency; and
    estimating the service availability (STSA) of a type stack that includes N component types for providing the HA service as:

$$STSA = \prod_{j=1}^{j \leq N} \frac{MTTF_j}{MTTF_j + MTTR_j}.$$

6. The method of claim 1, wherein the HA service is of a first service type defined for an application, and wherein estimating the service availability further comprises:
    estimating the service availability for each of a plurality of service types defined for the application; and
    eliminating a subset of the type stacks that do not satisfy the requested service availability for one or more of the service types.

7. The method of claim 1, wherein the HA service is of a first service type defined for an application, and wherein estimating the service availability further comprises:
    estimating the service availability for each of a plurality of service types defined for the application; and
    selecting a subset of the type stacks that provide higher service availability for one or more of the service types than the rest of the type stacks.

8. The method of claim 1, wherein, after elimination of the one or more type stacks, the method further comprises:
    creating Availability Management Framework (AMF) entities for at least one remaining type stack that has not been eliminated, wherein creating the AMF entities further comprises determining, based on the requested service availability, a number of components to be placed in an SU for each component type in the at least one remaining type stack.

9. The method of claim 8, wherein determining the number of components further comprises:
    calculating a minimum number of components of a component type to be placed in the SU for providing a requested number of CSIs in a single service instance (SI), wherein the CSIs are of a component service type (CST) provided by the component type;
    calculating a maximum number of components of the component type to be placed in the SU to guarantee that the SU provides a requested number of SIs for the HA service; and
    calculating number of components of the component type to be placed in the SU to satisfy the requested service availability, wherein the number is an integer multiple of the minimum number and is less than or equal to the maximum number.

10. The method of claim 8, further comprising:
    calculating, for each of a plurality of CSTs of the HA service, a maximum number of SIs that can be provided by a SU;
    calculating a first number of SUs to provide for a requested number of SIs subject to a given redundancy model that determines assignments of SIs to SUs per service group (SG);
    calculating a second number of SGs when the first number of SUs exceeds a cluster size; and
    distributing the first number of SUs among the second number of SGs substantially evenly.

11. The method of claim 8, further comprising:
    calculating, for each of a plurality of CSTs of the HA service, a number of SGs subject to a given redundancy model that determines assignments of SIs to SUs per SG;
    choosing a maximum number of SGs among the CSTs;
    calculating, for a given redundancy model that provides redundant assignments of SIs to SUs, at least one of a first maximum number of SIs per active SU and a second maximum number of SIs per standby SU; and
    calculating a number of SGs based on a requested number of SIs, and the at least one of the first maximum number and the second maximum number.

12. A system adapted to generate a configuration for a service provider system to provide a highly available (HA) service, the system comprising:
a memory; and
one or more processors coupled to the memory, the one or more processors adapted to:
identify type stacks that provide the HA service and one or more component types in each type stack, wherein each type stack is a combination of prototypes that describe features and capabilities of available software providing the HA service;
estimate, for each component type in the type stacks, a mean-time-to-recover (MTTR) of the HA service based on time for completing recovery action in response to a component failure;
estimate service availability provided by each type stack based on the MTTR and a mean-time-to-failure (MTTF) of each component type in the type stack; and
eliminate one or more of the type stacks that do not satisfy a requested service availability before proceeding to subsequent steps of configuration generation.

13. The system of claim 12, wherein the one or more processors are further adapted to count a single component for each component type in the type stacks when estimating the service availability and wherein the MTTR is estimated at one or more levels that include a component level, a service unit (SU) level, a node level, and an application level.

14. The system of claim 12, wherein, when the recovery action includes a component restart recovery action, the one or more processors are further adapted to estimate the MTTR of a component type as a sum of a first average outage time due to component instantiation attempts without delay, a second average outage time due to component instantiation attempts with delay, and a third average outage time due to failure of all of component instantiation attempts.

15. The system of claim 12 wherein, when the recovery action includes a component failover recovery action, the one or more processors are further adapted to estimate the MTTR of a component type as a sum of a first element for which the component clean-up is successful and a second element for which the component clean-up is not successful.

16. The system of claim 12, wherein the one or more processors are further adapted to:
identify dependency at one or more levels within the HA service; and
adjust estimation of the service availability to account for the dependency; and
estimate the service availability (STSA) of a type stack that includes N component types for providing the HA service as:

$$STSA = \prod_{j=1}^{j \leq N} \frac{MTTF_j}{MTTF_j + MTTR_j}.$$

17. The system of claim 12, wherein the HA service is of a first service type defined for an application, and wherein the one or more processors are further adapted to:
estimate the service availability for each of a plurality of service types defined for the application; and
eliminate a subset of the type stacks that do not satisfy the requested service availability for one or more of the service types.

18. The system of claim 12, wherein the HA service is of a first service type defined for an application, and wherein the one or more processors are further adapted to:
estimate the service availability for each of a plurality of service types defined for the application; and
select a subset of the type stacks that provide higher service availability for one or more of the service types than the rest of the type stacks.

19. The system of claim 12, wherein, after elimination of the one or more type stacks, the one or more processors are further adapted to:
create Availability Management Framework (AMF) entities for at least one remaining type stack that has not been eliminated; and
determine, based on the requested service availability, a number of components to be placed in an SU for each component type in the at least one remaining type stack.

20. The system of claim 19, wherein the one or more processors are further adapted to:
calculate a minimum number of components of a component type to be placed in the SU for providing a requested number of CSIs in a single service instance (SI), wherein the CSIs are of a component service type (CST) provided by the component type;
calculate a maximum number of components of the component type to be placed in the SU to guarantee that the SU provides a requested number of SIs for the HA service; and
calculate number of components of the component type to be placed in the SU to satisfy the requested service availability, wherein the number is an integer multiple of the minimum number and is less than or equal to the maximum number.

21. The system of claim 19, wherein the one or more processors are further adapted to:
calculate, for each of a plurality of CSTs of the HA service, a maximum number of SIs that can be provided by a SU;
calculate a first number of SUs to provide for a requested number of SIs subject to a given redundancy model that determines assignments of SIs to SUs per service group (SG);
calculate a second number of SGs when the first number of SUs exceeds a cluster size; and
distribute the first number of SUs among the second number of SGs substantially evenly.

22. The system of claim 19, wherein the one or more processors are further adapted to:
calculate, for each of a plurality of CSTs of the HA service, a number of SGs subject to a given redundancy model that determines assignments of SIs to SUs per SG;
choose a maximum number of SGs among the CSTs;
calculate, for a given redundancy model that provides redundant assignments of SIs to SUs, at least one of a first maximum number of SIs per active SU and a second maximum number of SIs per standby SU; and
calculate a number of SGs based on a requested number of SIs, and the at least one of the first maximum number and the second maximum number.

* * * * *